US011315398B2

(12) United States Patent
Blaser et al.

(10) Patent No.: US 11,315,398 B2
(45) Date of Patent: Apr. 26, 2022

(54) GATEWAY-BASED ANTI-THEFT SECURITY SYSTEM AND METHOD

(71) Applicant: Mobile Tech, Inc., Lake Oswego, OR (US)

(72) Inventors: Robert Logan Blaser, Farmington, UT (US); Kristopher Wendell Schatz, Hillsboro, OR (US); Hunter Anderson Wylie, Sherwood, OR (US)

(73) Assignee: Mobile Tech, Inc., Hillsboro, OR (US)

( * ) Notice: Subject to any disclaimer, the term of this patent is extended or adjusted under 35 U.S.C. 154(b) by 0 days.

(21) Appl. No.: 15/488,383

(22) Filed: Apr. 14, 2017

(65) Prior Publication Data
US 2017/0301205 A1 Oct. 19, 2017

Related U.S. Application Data

(60) Provisional application No. 62/323,466, filed on Apr. 15, 2016, provisional application No. 62/323,511, filed on Apr. 15, 2016.

(51) Int. Cl.
*H04B 1/3816* (2015.01)
*G08B 13/14* (2006.01)
(Continued)

(52) U.S. Cl.
CPC ...... *G08B 13/1445* (2013.01); *B60R 25/1003* (2013.01); *B60R 25/24* (2013.01);
(Continued)

(58) Field of Classification Search
CPC combination set(s) only.
See application file for complete search history.

(56) References Cited

U.S. PATENT DOCUMENTS 883,335 A 3/1908 O'Connor
3,444,547 A 5/1969 Surek
(Continued)

FOREIGN PATENT DOCUMENTS

AT 506665 A1 10/2009
CA 2465692 A1 11/2004
(Continued)

OTHER PUBLICATIONS

Patent Owner's Response of U.S. Pat. No. 9,135,800, Case IPR2016-00895, Filed Jan. 11, 2017, pp. 1-68.
(Continued)

*Primary Examiner* — Hai Phan
*Assistant Examiner* — Anthony D Afrifa-Kyei
(74) *Attorney, Agent, or Firm* — Olympic Patent Works PLLC

(57) ABSTRACT

Improved systems and techniques are disclosed for controlling the security states of anti-theft security systems such as product display assemblies using security fobs. The tasks relating to fob authentication are offloaded to a computer system, and these authentications can be based on identifiers for the different security fobs. The interactions between security fobs and product display assemblies can be consistent regardless of the population of authorized security fobs by using a security code that is shared by the security fobs. When attempting to use a security fob to change a security status for a product display assembly, the provision of the code to the subject product display assembly can be predicated on authorization of the subject security fob by the computer system. The computer system can maintain a list of identifiers for authorized security fobs that is easily updated when new security fobs are added to or existing security fobs are de-authorized from the system.

14 Claims, 26 Drawing Sheets

(51) Int. Cl.
| | |
|---|---|
| *H04W 4/50* | (2018.01) |
| *H04W 48/02* | (2009.01) |
| *G06F 21/34* | (2013.01) |
| *B60R 25/10* | (2013.01) |
| *B60R 25/24* | (2013.01) |
| *F17D 3/01* | (2006.01) |
| *G07C 9/00* | (2020.01) |
| *G08B 13/24* | (2006.01) |
| *H04B 1/3877* | (2015.01) |
| *H04W 12/082* | (2021.01) |
| *H04W 12/0471* | (2021.01) |
| *G06F 21/31* | (2013.01) |
| *G06F 21/45* | (2013.01) |
| *G06F 21/88* | (2013.01) |
| *H04W 48/08* | (2009.01) |
| *H04W 48/00* | (2009.01) |
| *G05B 19/04* | (2006.01) |
| *H04W 48/16* | (2009.01) |
| *G08B 25/00* | (2006.01) |
| *G07C 9/20* | (2020.01) |
| *H04W 12/04* | (2021.01) |
| *H04W 12/08* | (2021.01) |
| *G08B 13/06* | (2006.01) |

(52) U.S. Cl.
CPC ............... *F17D 3/01* (2013.01); *G06F 21/31* (2013.01); *G06F 21/34* (2013.01); *G06F 21/45* (2013.01); *G06F 21/88* (2013.01); *G07C 9/00174* (2013.01); *G07C 9/00817* (2013.01); *G08B 13/14* (2013.01); *G08B 13/1454* (2013.01); *G08B 13/2431* (2013.01); *G08B 13/2434* (2013.01); *H04B 1/3816* (2013.01); *H04B 1/3877* (2013.01); *H04W 4/50* (2018.02); *H04W 12/0471* (2021.01); *H04W 12/082* (2021.01); *H04W 48/02* (2013.01); *B60R 2225/00* (2013.01); *G05B 19/04* (2013.01); *G07C 9/20* (2020.01); *G07C 2009/00769* (2013.01); *G08B 13/06* (2013.01); *G08B 25/008* (2013.01); *G08C 2201/20* (2013.01); *G08C 2201/21* (2013.01); *H04W 12/04* (2013.01); *H04W 12/08* (2013.01); *H04W 48/00* (2013.01); *H04W 48/08* (2013.01); *H04W 48/16* (2013.01)

(56) References Cited

U.S. PATENT DOCUMENTS

| | | |
|---|---|---|
| 3,733,861 A | 5/1973 | Lester |
| 3,780,909 A | 12/1973 | Callahan et al. |
| 4,031,434 A | 6/1977 | Perron et al. |
| 4,053,939 A | 10/1977 | Nakauchi et al. |
| 4,075,878 A | 2/1978 | Best |
| 4,117,465 A | 9/1978 | Timblin |
| 4,167,104 A | 9/1979 | Bond |
| 4,205,325 A | 5/1980 | Haygood et al. |
| 4,206,491 A | 6/1980 | Ligman et al. |
| 4,268,076 A | 5/1981 | Itoi |
| 4,335,931 A | 6/1982 | Kinnear |
| 4,353,064 A | 10/1982 | Stamm |
| 4,354,189 A | 10/1982 | Lemelson |
| 4,354,613 A | 10/1982 | Desai et al. |
| 4,369,442 A | 1/1983 | Werth et al. |
| 4,384,688 A | 5/1983 | Smith |
| 4,391,204 A | 7/1983 | Mitchell et al. |
| 4,509,093 A | 4/1985 | Stellberger |
| 4,590,337 A | 5/1986 | Engelmore |
| 4,594,637 A | 6/1986 | Falk |
| 4,611,205 A | 9/1986 | Eglise |
| 4,670,747 A | 6/1987 | Borras et al. |
| 4,672,375 A | 6/1987 | Mochida et al. |
| 4,674,454 A | 6/1987 | Phairr |
| 4,688,036 A | 8/1987 | Hirano et al. |
| 4,703,359 A | 10/1987 | Rumbolt et al. |
| 4,709,202 A | 11/1987 | Koenck et al. |
| 4,714,184 A | 12/1987 | Young et al. |
| 4,720,700 A | 1/1988 | Seibold et al. |
| 4,727,369 A | 2/1988 | Rode et al. |
| 4,746,919 A | 5/1988 | Reitmeier |
| 4,760,393 A | 7/1988 | Mauch |
| 4,766,746 A | 8/1988 | Henderson et al. |
| 4,772,878 A | 9/1988 | Kane |
| 4,779,090 A | 10/1988 | Micznik et al. |
| 4,791,280 A | 12/1988 | O'Connell et al. |
| 4,811,012 A | 3/1989 | Rollins |
| 4,827,395 A | 5/1989 | Anders et al. |
| 4,829,290 A | 5/1989 | Ford |
| 4,829,296 A | 5/1989 | Clark et al. |
| 4,839,639 A | 6/1989 | Sato et al. |
| 4,857,914 A | 8/1989 | Thrower |
| 4,887,292 A | 12/1989 | Barrett |
| 4,898,493 A | 2/1990 | Blankenburg |
| 4,918,431 A | 4/1990 | Borras |
| 4,926,996 A | 5/1990 | Eglise et al. |
| 4,942,393 A | 7/1990 | Waraksa et al. |
| 4,952,864 A | 8/1990 | Pless et al. |
| 4,967,305 A | 10/1990 | Murrer et al. |
| 5,021,776 A | 6/1991 | Anderson et al. |
| 5,043,720 A | 8/1991 | Laurienzo |
| 5,065,356 A | 11/1991 | Puckette |
| 5,072,213 A | 12/1991 | Close |
| 5,090,222 A | 2/1992 | Imran |
| 5,109,530 A | 4/1992 | Stengel |
| 5,113,182 A | 5/1992 | Suman et al. |
| 5,140,317 A | 8/1992 | Hyatt, Jr. et al. |
| 5,146,205 A | 9/1992 | Keifer et al. |
| 5,176,465 A | 1/1993 | Holsted |
| 5,184,855 A | 2/1993 | Waltz et al. |
| 5,245,329 A | 9/1993 | Gokcebay |
| 5,246,183 A | 9/1993 | Leyden |
| 5,272,475 A | 12/1993 | Eaton et al. |
| 5,278,547 A | 1/1994 | Suman et al. |
| 5,280,518 A | 1/1994 | Danler et al. |
| 5,280,527 A | 1/1994 | Gullman et al. |
| 5,337,588 A | 8/1994 | Chhatwal |
| 5,339,250 A | 8/1994 | Durbin |
| 5,343,077 A | 8/1994 | Yoshida et al. |
| 5,347,267 A | 9/1994 | Murray |
| 5,347,419 A | 9/1994 | Caron et al. |
| 5,349,345 A | 9/1994 | Vanderschel |
| 5,389,919 A | 2/1995 | Warren et al. |
| 5,392,025 A | 2/1995 | Figh et al. |
| 5,394,718 A | 3/1995 | Hotzl |
| 5,473,236 A | 12/1995 | Frolov |
| 5,473,318 A | 12/1995 | Martel |
| 5,475,375 A | 12/1995 | Barrett et al. |
| 5,477,041 A | 12/1995 | Miron et al. |
| 5,479,151 A | 12/1995 | Lavelle et al. |
| 5,506,575 A | 4/1996 | Ormos |
| 5,543,782 A | 8/1996 | Rothbaum et al. |
| 5,552,777 A | 9/1996 | Gokcebay et al. |
| 5,561,420 A | 10/1996 | Kleefeldt et al. |
| 5,575,515 A | 11/1996 | Iwamoto et al. |
| 5,602,536 A | 2/1997 | Henderson et al. |
| 5,617,082 A | 4/1997 | Denison et al. |
| 5,625,338 A | 4/1997 | Pildner et al. |
| 5,625,349 A | 4/1997 | Disbrow et al. |
| 5,636,881 A | 6/1997 | Stillwagon |
| 5,661,470 A | 8/1997 | Karr |
| 5,673,034 A | 9/1997 | Saliga |
| 5,685,436 A | 11/1997 | Davet |
| 5,686,902 A | 11/1997 | Reis et al. |
| 5,742,238 A | 4/1998 | Fox |
| 5,745,044 A | 4/1998 | Hyatt, Jr. et al. |
| 5,767,792 A | 6/1998 | Urbas et al. |
| 5,771,722 A | 6/1998 | DiVito et al. |
| 5,774,053 A | 6/1998 | Porter |
| 5,774,058 A | 6/1998 | Henry et al. |
| 5,774,059 A | 6/1998 | Henry et al. |

(56) References Cited

U.S. PATENT DOCUMENTS

| | | |
|---|---|---|
| 5,805,074 A | 9/1998 | Warren et al. |
| 5,813,257 A | 9/1998 | Claghorn et al. |
| 5,841,866 A | 11/1998 | Bruwer et al. |
| 5,861,807 A | 1/1999 | Leyden et al. |
| 5,873,276 A | 2/1999 | Dawson et al. |
| 5,886,644 A | 3/1999 | Keskin et al. |
| 5,894,277 A | 4/1999 | Keskin et al. |
| 6,005,487 A | 12/1999 | Hyatt, Jr. et al. |
| 6,038,491 A | 3/2000 | McGarry et al. |
| 6,039,496 A | 3/2000 | Bishop |
| 6,040,771 A | 3/2000 | Kim |
| 6,068,305 A | 5/2000 | Myers et al. |
| 6,130,602 A | 10/2000 | O'Toole et al. |
| 6,170,775 B1 | 1/2001 | Kovacik et al. |
| 6,204,764 B1 | 3/2001 | Maloney |
| 6,211,747 B1 | 4/2001 | Trichet et al. |
| 6,219,700 B1 | 4/2001 | Chang et al. |
| 6,236,435 B1 | 5/2001 | Gertz |
| 6,318,137 B1 | 11/2001 | Chaum |
| 6,323,782 B1 | 11/2001 | Stephens et al. |
| 6,339,731 B1 | 1/2002 | Morris et al. |
| 6,342,830 B1 | 1/2002 | Want et al. |
| 6,345,522 B1 | 2/2002 | Stillwagon et al. |
| 6,359,547 B1 | 3/2002 | Denison et al. |
| 6,380,855 B1 | 4/2002 | Ott |
| 6,384,709 B2 | 5/2002 | Mellen et al. |
| 6,386,906 B1 | 5/2002 | Burke |
| 6,401,059 B1 | 6/2002 | Shen et al. |
| 6,437,740 B1 | 8/2002 | De Champlain et al. |
| 6,457,038 B1 | 9/2002 | Defosse |
| 6,472,973 B1 | 10/2002 | Harold et al. |
| 6,476,717 B1 | 11/2002 | Gross et al. |
| 6,483,424 B1 | 11/2002 | Bianco |
| 6,496,101 B1 | 12/2002 | Stillwagon |
| 6,502,727 B1 | 1/2003 | Decoteau |
| 6,525,644 B1 | 2/2003 | Stillwagon |
| 6,563,417 B1 * | 5/2003 | Shaw ............... G06K 7/0008 340/10.1 |
| 6,575,504 B2 | 6/2003 | Roatis et al. |
| 6,581,421 B2 | 6/2003 | Chmela et al. |
| 6,581,986 B2 | 6/2003 | Roatis et al. |
| 6,584,309 B1 | 6/2003 | Whigham |
| 6,659,382 B2 | 12/2003 | Ryczek |
| 6,684,671 B2 | 2/2004 | Beylotte et al. |
| 6,693,512 B1 | 2/2004 | Frecska et al. |
| 6,717,517 B2 | 4/2004 | Przygoda, Jr. |
| 6,725,138 B2 | 4/2004 | DeLuca et al. |
| 6,731,212 B2 | 5/2004 | Hirose et al. |
| 6,748,707 B1 | 6/2004 | Buchalter et al. |
| 6,761,579 B2 | 7/2004 | Fort et al. |
| 6,786,766 B1 | 9/2004 | Chopra |
| 6,799,994 B2 | 10/2004 | Burke |
| 6,831,560 B2 | 12/2004 | Gresset |
| 6,867,685 B1 | 3/2005 | Stillwagon |
| 6,874,828 B2 | 4/2005 | Roatis et al. |
| 6,882,282 B1 | 4/2005 | Lie-Nielsen et al. |
| 6,896,543 B2 | 5/2005 | Fort et al. |
| 6,900,720 B2 | 5/2005 | Denison et al. |
| 6,946,961 B2 | 9/2005 | Frederiksen et al. |
| 6,961,401 B1 | 11/2005 | Nally et al. |
| 6,975,202 B1 | 12/2005 | Rodriguez et al. |
| 6,977,576 B2 | 12/2005 | Denison et al. |
| 7,015,596 B2 | 3/2006 | Pail |
| 7,053,774 B2 | 5/2006 | Sedon et al. |
| 7,081,822 B2 | 7/2006 | Leyden et al. |
| 7,101,187 B1 | 9/2006 | Deconinck et al. |
| 7,132,952 B2 | 11/2006 | Leyden et al. |
| 7,135,972 B2 | 11/2006 | Bonato |
| 7,145,434 B2 | 12/2006 | Mlynarczyk et al. |
| 7,154,039 B1 | 12/2006 | Marszalek et al. |
| 7,209,038 B1 | 4/2007 | Deconinck et al. |
| 7,287,652 B2 | 10/2007 | Scholen et al. |
| 7,295,100 B2 | 11/2007 | Denison et al. |
| 7,317,387 B1 | 1/2008 | Cova et al. |
| 7,325,728 B2 | 2/2008 | Arora et al. |
| 7,373,352 B2 | 5/2008 | Roatis et al. |
| 7,385,504 B2 | 6/2008 | Agrawal et al. |
| 7,385,522 B2 | 6/2008 | Belden, Jr. et al. |
| 7,387,003 B2 | 6/2008 | Marszalek et al. |
| 7,394,346 B2 | 7/2008 | Bodin |
| 7,446,659 B2 | 11/2008 | Marsilio et al. |
| 7,456,725 B2 | 11/2008 | Denison et al. |
| 7,482,907 B2 | 1/2009 | Denison et al. |
| 7,495,543 B2 | 2/2009 | Denison et al. |
| 7,522,047 B2 | 4/2009 | Belden, Jr. et al. |
| 7,626,500 B2 | 12/2009 | Belden, Jr. et al. |
| 7,667,601 B2 | 2/2010 | Rabinowitz et al. |
| 7,688,205 B2 | 3/2010 | Ott |
| 7,710,266 B2 | 5/2010 | Belden, Jr. et al. |
| 7,724,135 B2 | 5/2010 | Rapp et al. |
| 7,737,843 B2 | 6/2010 | Belden, Jr. et al. |
| 7,737,844 B2 | 6/2010 | Scott et al. |
| 7,737,845 B2 | 6/2010 | Fawcett et al. |
| 7,737,846 B2 | 6/2010 | Belden, Jr. et al. |
| 7,744,404 B1 | 6/2010 | Henson et al. |
| 7,762,457 B2 | 7/2010 | Bonalle et al. |
| 7,762,470 B2 | 7/2010 | Finn et al. |
| 7,821,395 B2 | 10/2010 | Denison et al. |
| 7,909,641 B1 | 3/2011 | Henson et al. |
| 7,969,305 B2 | 6/2011 | Belden, Jr. et al. |
| 7,971,845 B2 | 7/2011 | Galant |
| 8,009,348 B2 | 8/2011 | Zehner et al. |
| D649,076 S | 11/2011 | Alexander |
| 8,102,262 B2 | 1/2012 | Irmscher et al. |
| D663,972 S | 7/2012 | Alexander et al. |
| 8,499,384 B2 | 8/2013 | Zerhusen |
| 8,558,688 B2 | 10/2013 | Henson et al. |
| 8,698,618 B2 | 4/2014 | Henson et al. |
| 8,749,194 B1 | 6/2014 | Kelsch et al. |
| 8,847,759 B2 | 9/2014 | Bisesti et al. |
| 8,884,762 B2 | 11/2014 | Fawcett et al. |
| 8,896,447 B2 | 11/2014 | Fawcett et al. |
| 8,955,807 B2 | 2/2015 | Alexander et al. |
| 8,963,498 B2 | 2/2015 | Ferguson |
| 8,989,954 B1 | 3/2015 | Addepalli et al. |
| 9,092,960 B2 | 7/2015 | Wheeler |
| 9,097,380 B2 | 8/2015 | Wheeler |
| 9,135,800 B2 | 9/2015 | Fawcett et al. |
| 9,171,441 B2 | 10/2015 | Fawcett et al. |
| 9,220,358 B2 | 12/2015 | Wheeler et al. |
| 9,269,247 B2 | 2/2016 | Fawcett et al. |
| 9,303,809 B2 | 4/2016 | Reynolds et al. |
| 9,373,236 B2 | 6/2016 | Oehl et al. |
| 9,396,631 B2 | 7/2016 | Fawcett et al. |
| 9,443,404 B2 | 9/2016 | Grant et al. |
| 9,478,110 B2 | 10/2016 | Fawcett et al. |
| 9,576,452 B2 | 2/2017 | Fawcett et al. |
| 9,659,472 B2 | 5/2017 | Fawcett et al. |
| 9,754,431 B2 * | 9/2017 | Sigal ..................... B60R 25/24 |
| 9,959,432 B2 | 5/2018 | Blaser et al. |
| 10,026,281 B2 | 7/2018 | Henson et al. |
| 10,269,202 B2 | 4/2019 | Denison |
| 2001/0000430 A1 | 4/2001 | Smith et al. |
| 2001/0049222 A1 | 12/2001 | Fort et al. |
| 2002/0014950 A1 | 2/2002 | Ayala et al. |
| 2002/0024418 A1 | 2/2002 | Ayala et al. |
| 2002/0024420 A1 | 2/2002 | Ayala et al. |
| 2002/0046173 A1 | 4/2002 | Kelly |
| 2002/0063157 A1 | 5/2002 | Hara |
| 2002/0085343 A1 | 7/2002 | Wu et al. |
| 2002/0099945 A1 * | 7/2002 | McLintock ............ G07C 9/27 713/186 |
| 2002/0133716 A1 | 9/2002 | Harif |
| 2002/0162366 A1 | 11/2002 | Chmela et al. |
| 2003/0007634 A1 | 1/2003 | Wang |
| 2003/0010859 A1 | 1/2003 | Ryczek |
| 2003/0030539 A1 | 2/2003 | McGarry et al. |
| 2003/0127866 A1 | 7/2003 | Martinez et al. |
| 2003/0128101 A1 | 7/2003 | Long |
| 2003/0234719 A1 | 12/2003 | Denison et al. |
| 2004/0003150 A1 | 1/2004 | Deguchi |
| 2004/0039919 A1 | 2/2004 | Takayama et al. |
| 2004/0077210 A1 | 4/2004 | Kollmann |
| 2004/0133653 A1 | 7/2004 | Defosse et al. |

(56) References Cited

U.S. PATENT DOCUMENTS

| | | |
|---|---|---|
| 2004/0174264 A1 | 9/2004 | Reisman et al. |
| 2004/0178885 A1 | 9/2004 | Denison et al. |
| 2004/0201449 A1 | 10/2004 | Denison et al. |
| 2004/0207509 A1 | 10/2004 | Mlynarczyk et al. |
| 2005/0017906 A1 | 1/2005 | Man et al. |
| 2005/0024227 A1 | 2/2005 | Dunstan |
| 2005/0073413 A1 | 4/2005 | Sedon et al. |
| 2005/0088572 A1 | 4/2005 | Pandit et al. |
| 2005/0165806 A1 | 7/2005 | Roatis et al. |
| 2005/0184857 A1 | 8/2005 | Roatis et al. |
| 2005/0206522 A1 | 9/2005 | Leyden et al. |
| 2005/0212656 A1 | 9/2005 | Denison et al. |
| 2005/0231365 A1 | 10/2005 | Tester et al. |
| 2005/0285716 A1 | 12/2005 | Denison et al. |
| 2006/0001541 A1 | 1/2006 | Leyden et al. |
| 2006/0038654 A1 | 2/2006 | Khalil |
| 2006/0047692 A1 | 3/2006 | Rosenblum et al. |
| 2006/0170533 A1 | 8/2006 | Chioiu et al. |
| 2006/0219517 A1 | 10/2006 | Cheng et al. |
| 2006/0281484 A1 | 12/2006 | Kronlund et al. |
| 2007/0075914 A1 | 4/2007 | Bates |
| 2007/0159328 A1 | 7/2007 | Belden et al. |
| 2007/0164324 A1 | 7/2007 | Denison et al. |
| 2007/0229259 A1 | 10/2007 | Irmscher et al. |
| 2007/0245369 A1 | 10/2007 | Thompson et al. |
| 2007/0296551 A1* | 12/2007 | Beenau ............ G07C 9/29 340/10.1 |
| 2008/0094220 A1 | 4/2008 | Foley et al. |
| 2008/0168806 A1 | 7/2008 | Belden et al. |
| 2008/0169923 A1 | 7/2008 | Belden et al. |
| 2008/0222849 A1 | 9/2008 | Lavoie |
| 2009/0007390 A1 | 1/2009 | Tsang et al. |
| 2009/0033492 A1 | 2/2009 | Rapp et al. |
| 2009/0051486 A1 | 2/2009 | Denison et al. |
| 2009/0061863 A1 | 3/2009 | Huggett et al. |
| 2009/0121831 A1* | 5/2009 | Zingsheim ......... G05B 19/042 340/5.22 |
| 2009/0173868 A1 | 7/2009 | Fawcett et al. |
| 2009/0200374 A1* | 8/2009 | Jentoft ............. G08B 13/2491 235/382 |
| 2010/0065632 A1 | 3/2010 | Babcock et al. |
| 2010/0315197 A1 | 12/2010 | Solomon et al. |
| 2011/0053557 A1 | 3/2011 | Despain et al. |
| 2011/0068919 A1 | 3/2011 | Rapp et al. |
| 2011/0254661 A1 | 10/2011 | Fawcett et al. |
| 2011/0276609 A1 | 11/2011 | Denison |
| 2011/0283754 A1 | 11/2011 | Ezzo et al. |
| 2011/0303816 A1 | 12/2011 | Horvath et al. |
| 2011/0309934 A1 | 12/2011 | Henson et al. |
| 2012/0037783 A1 | 2/2012 | Alexander et al. |
| 2012/0043451 A1 | 2/2012 | Alexander et al. |
| 2012/0074223 A1 | 3/2012 | Habraken |
| 2012/0126943 A1 | 5/2012 | Biondo et al. |
| 2012/0205325 A1 | 8/2012 | Richter et al. |
| 2012/0205326 A1* | 8/2012 | Richter ............. A47F 7/024 211/4 |
| 2012/0217371 A1 | 8/2012 | Abdollahzadeh et al. |
| 2012/0280810 A1 | 11/2012 | Wheeler |
| 2012/0286118 A1 | 11/2012 | Richards |
| 2013/0026322 A1 | 1/2013 | Wheeler et al. |
| 2013/0043369 A1 | 2/2013 | Wheeler |
| 2013/0109375 A1 | 5/2013 | Zeiler et al. |
| 2013/0161054 A1 | 6/2013 | Allison et al. |
| 2013/0168527 A1 | 7/2013 | Wheeler et al. |
| 2013/0196530 A1 | 8/2013 | Cheatham et al. |
| 2013/0238516 A1 | 9/2013 | Moock et al. |
| 2013/0268316 A1 | 10/2013 | Moock et al. |
| 2013/0294740 A1 | 11/2013 | Teetzel et al. |
| 2014/0043162 A1 | 2/2014 | Siciliano et al. |
| 2014/0091932 A1 | 4/2014 | Mohiuddin et al. |
| 2014/0136840 A1* | 5/2014 | Spalka ............. H04L 9/3247 713/165 |
| 2014/0168884 A1 | 6/2014 | Wylie |
| 2014/0237236 A1 | 8/2014 | Kalinichenko et al. |
| 2014/0266573 A1 | 9/2014 | Sullivan |
| 2014/0277837 A1 | 9/2014 | Hatton |
| 2014/0313010 A1 | 10/2014 | Huang et al. |
| 2015/0022332 A1 | 1/2015 | Lin |
| 2015/0048625 A1 | 2/2015 | Weusten et al. |
| 2015/0091729 A1 | 4/2015 | Phillips et al. |
| 2015/0178532 A1 | 6/2015 | Brule |
| 2015/0213067 A1 | 7/2015 | Yin |
| 2015/0279130 A1 | 10/2015 | Robertson et al. |
| 2015/0348381 A1 | 12/2015 | Fawcett et al. |
| 2016/0028713 A1 | 1/2016 | Chui et al. |
| 2016/0042620 A1 | 2/2016 | Dandie et al. |
| 2016/0239796 A1 | 8/2016 | Grant et al. |
| 2016/0307209 A1 | 10/2016 | Marszalek |
| 2016/0307415 A1 | 10/2016 | Marszalek et al. |
| 2016/0307416 A1 | 10/2016 | Marszalek et al. |
| 2016/0308952 A1 | 10/2016 | Marszalek et al. |
| 2016/0335859 A1 | 11/2016 | Sankey |
| 2016/0371944 A1* | 12/2016 | Phillips ............ G08B 13/1427 |
| 2016/0379455 A1* | 12/2016 | Grant ............... G08B 13/1445 340/568.2 |
| 2017/0154508 A1 | 6/2017 | Grant et al. |
| 2017/0193780 A1 | 7/2017 | Moock et al. |
| 2017/0300721 A1 | 10/2017 | Blaser et al. |
| 2017/0372543 A1 | 12/2017 | Grant et al. |
| 2018/0144593 A1 | 5/2018 | Henson et al. |
| 2018/0286195 A1 | 10/2018 | Baker et al. |

FOREIGN PATENT DOCUMENTS

| | | |
|---|---|---|
| DE | 202009013722 U1 | 1/2011 |
| EP | 0704352 | 4/1996 |
| EP | 0745747 A1 | 12/1996 |
| EP | 1575249 A2 | 9/2005 |
| ES | 1058183 U | 11/2004 |
| FR | 2595227 A1 | 9/1987 |
| FR | 2768906 A1 | 4/1999 |
| FR | 2868459 A1 | 10/2005 |
| GB | 2427056 A | 12/2006 |
| GB | 2440600 A | 2/2008 |
| JP | 4238979 A | 8/1992 |
| JP | H0573857 U | 10/1993 |
| JP | 0689391 A | 3/1994 |
| JP | H0668913 A | 3/1994 |
| JP | 1997-259368 | 10/1997 |
| JP | 3100287 B2 | 10/2000 |
| KR | 20140126675 A | 10/2014 |
| WO | 1997031347 A1 | 8/1997 |
| WO | 2004038670 A1 | 5/2004 |
| WO | 2009/042905 A | 4/2009 |
| WO | 2012039794 A1 | 3/2012 |
| WO | 2012069816 A1 | 5/2012 |
| WO | 2012151130 A2 | 11/2012 |
| WO | 2013015855 A2 | 1/2013 |
| WO | 2013068036 A1 | 5/2013 |
| WO | 2013134484 A1 | 9/2013 |
| WO | 2014019072 A1 | 2/2014 |
| WO | 2014107184 A2 | 7/2014 |
| WO | 2014134718 A1 | 9/2014 |
| WO | 2015050710 A2 | 4/2015 |
| WO | 2015051840 A1 | 4/2015 |
| WO | 2015/112336 A1 | 7/2015 |
| WO | 2016/130762 A1 | 8/2016 |
| WO | 2016/179250 A2 | 11/2016 |

OTHER PUBLICATIONS

Patent Owner's Response of U.S. Pat. No. 9,135,800, Case IPR2016-00896, Filed Jan. 11, 2017, pp. 1-60.

Patent Owner's Response of U.S. Pat. No. 9,269,247, Case IPR2016-00899, Jan. 18, 2017, pp. 1-46.

Petition For Inter Partes Review of Claims 1-18 of U.S. Pat. No. 7,737,846, Case IPR2016-01241, Jun. 21, 2016, pp. 1-73.

Petition For Inter Partes Review of Claims 1-19 of U.S. Pat. No. 7,737,844, Case IPR2016-01915, filed Sep. 30, 2016, pp. 1-76.

Petition For Inter Partes Review of Claims 1-27 of U.S. Pat. No. 8,884,762, Case IPR2016-00892, filed Apr. 14, 2016, pp. 1-65.

(56) References Cited

OTHER PUBLICATIONS

Petition for Inter Partes Review of Claims 1-29 of U.S. Pat. No. 9,396,631, Case IPR2017-00344, Nov. 29, 2016, pp. 1-65.
Petition for Inter Partes Review of Claims 1-29 of U.S. Pat. No. 9,396,631, Case IPR2017-00345, dated Nov. 29, 2016, pp. 1-63.
Petition for Inter Partes Review of Claims 1-36 of U.S. Pat. No. 9,478,110, Case IPR2017-01901, dated Jul. 31, 2017, pp. 1-71.
Petition for Inter Partes Review of Claims 1-9 and 11-36 of U.S. Pat. No. 9,478,110, Case IPR2017-01900, Jul. 31, 2017, pp. 1-68.
Petition for Inter Partes Review of Claims 25-37 of U.S. Pat. No. 9,269,247, Case IPR2016-00899, dated Apr. 14, 2016, pp. 1-65.
Propelinteractive, "Freedom Universal 2 Animation_003.wmv", YouTube Video https://www.youtube.com/watch?v=_odGNnQvOBQ&t=1s, published on Feb. 16, 2010 (see sample screenshots, pp. 1-24).
Propelinteractive, "Installing LP3 Old Version", YouTube Video <https://www.youtube.com/watch?> v=FRUaOFWiDRw&t=1s, published on Jun. 28, 2010 (see sample screenshots, pp. 1-9).
Propelinteractive, "MTI LP3 Product Mounting", YouTube Video <https://www.youtube.com/watch?> v=KX4TEuj1jCI, published on Jun. 23, 2010 (see sample screenshots, pp. 1-11).
Prosecution History for U.S. Appl. No. 12/819,944, now U.S. Pat. No. 8,698,617, filed Jun. 21, 2010.
Prosecution History for U.S. Appl. No. 12/888,107, now U.S. Pat. No. 8,698,618, filed Sep. 22, 2010.
Prosecution History for U.S. Appl. No. 13/457,348, now U.S. Pat. No. 8,558,688, filed Apr. 26, 2012.
Prosecution History for U.S. Appl. No. 14/066,606, filed Oct. 29, 2013 (now abandoned).
Prosecution History for U.S. Appl. No. 14/092,845, filed Nov. 27, 2013 (now abandoned).
Protex International Corp., "Instructions for PowerPro Detangler", 2005, 1 page.
Protex International Corp., "Instructions for PowerPro Sensor Head Cameras and Camcorders (Power and Security)", 2007, pp. 1-9.
Protex International Corp., "PowerPro System", 2006, pp. 1-2.
Reasons for Substantial New Question of Patentability Determination and Supplemental Examination Certificate, Inter Partes Review of U.S. Pat. No. 7,909,641, Case IPR2013-00122, Feb. 7, 2013, pp. 1-12, Exhibit 1019.
Retailgeek, "Virtual Tour of MTI Retail Innovation Center in 2009," YouTube Video https://www.youtube.com/watch?v=-wUvcDAmhj0, published on Aug. 2, 2010 (see transcript and sample screenshots, pp. 1-20).
Reuters, "MTI Begins Shipping Freedom™ Universal 2.0 Merchandising Solution", Oct. 1, 2008, 1 page.
Supplemental Declaration of Harry Direen, PH.D, P.E. in Support of Patent Owner's Responses for IPR2016-00892,-00895, -00896, -00898, and -00899, Inter Partes Review of U.S. Pat. No. 9,396,631, Case IPR2017-00344, Jan. 10, 2017, pp. 1-29.
U.S. Appl. No. 61/607,802, filed Mar. 7, 2012.
U.S. Appl. No. 61/620,621, filed Apr. 5, 2012.
U.S. Appl. No. 61/774,870, filed Mar. 8, 2013.
U.S. Appl. No. 61/884,098, filed Sep. 29, 2013.
Unicam Europe, "Freedom Lp3 4.17.09", SlideShare Presentation <https://www.slideshare.net/Borfu/freedom-lp3-41709,> published on Jul. 28, 2009 (pp. 1-9).
International Search Report and Written Opinion for PCT/US2017/027801 dated Aug. 29, 2017.
35 mm Camera Display—Walmart Publication 1995, pp. 1-5.
Corrected Petition for Inter Partes Review of Claims 1-24 of U.S. Pat. No. 9,269,247, Case IPR2016-00898, Apr. 19, 2016, pp. 1-65.
Corrected Petition For Inter Partes Review of Claims 1-34 of U.S. Pat. No. 9,135,800, Case IPR2016-00895, Filed Apr. 19, 2016, pp. 1-66.
Corrected Petition For Inter Partes Review of Claims 35-49 of U.S. Pat. No. 9,135,800, Case IPR2016-00896, Filed Apr. 19, 2016, pp. 1-64.
Decision Institution of Inter Partes Review for U.S. Pat. No. 9,269,247, Case IPR2016-00898, dated Sep. 29, 2016, pp. 1-29.
Decision Institution of Inter Partes Review for U.S. Pat. No. 9,269,247, Case IPR2016-00899, Sep. 29, 2016, pp. 1-25.
Decision Institution of Inter Partes Review of U.S. Pat. No. 9,396,631, Case IPR2017-00344, dated May 26, 2017, pp. 1-17.
Decision Institution of Inter Partes Review of U.S. Pat. No. 9,396,631, Case IPR2017-00345, dated May 26, 2017, pp. 1-18.
Decision of Institution of Inter Partes Review of U.S. Pat. No. 7,737,844, Case IPR2016-01915, filed Mar. 30, 2017, pp. 1-30.
Decision of Institution of Inter Partes Review of U.S. Pat. No. 7,737,846, Case IPR2016-01241, Dec. 20, 2016, pp. 1-22.
Decision of Institution of Inter Partes Review of U.S. Pat. No. 8,884,762, Case IPR2016-00892, filed Oct. 7, 2016, pp. 1-25.
Decision of Institution of Inter Partes Review of U.S. Pat. No. 9,135,800, Case IPR2016-00895, Filed Oct. 13, 2016, pp. 1-29.
Decision of Institution of Inter Partes Review of U.S. Pat. No. 9,135,800, Case IPR2016-00896, Filed Oct. 13, 2016, pp. 1-23.
Declaration of Christopher J. Fawcett in Support of Patent Owner's Response of U.S. Pat. No. 7,737,846, Case PR2016-01241, Mar. 3, 2017, pp. 1-25.
Declaration of Christopher J. Fawcett in Support of Patent Owner's Responses for IPR2016-00895 and PR2016-00896 dated Jan. 11, 2017, pp. 1-55.
Declaration of Harry Direen, PH. D, P.E. In Support of Patent Owner's Preliminary Responses for IPR2016-00892,-00895, -00896, -00898, and -00899, filed Jul. 18, 2016, pp. 1-41.
Declaration of Mike Cook, *Vanguard Products Group, Inc. v. Merchandising Technologies, Inc.*, Case No. 3:10-av-392-BR, U.S. District Court for the District of Oregon, Oct. 20, 2010, pp. 1-7.
Declaration of Thaine Allison in Support of Patent Owner's Reply to Petitioner's Opposition to Patent Owner's Motion to Amend, Inter Partes Review of U.S. Pat. No. 7,909,641, Case IPR2013-00122, dated Feb. 5, 2014, pp. 1-13.
Declaration of Thaine H. Allison III for U.S. Pat. No. 9,269,247, Case IPR2016-00898, dated Apr. 11, 2016, pp. 1-102.
Declaration of Thaine H. Allison III for U.S. Pat. No. 9,269,247, Case IPR2016-00899, Apr. 11, 2016, pp. 1-106.
Declaration of Thaine H. Allison III for U.S. Pat. No. 9,396,631, Case IPR2017-00344, Nov. 22, 2016, pp. 1-96.
Declaration of Thaine H. Allison III for U.S. Pat. No. 9,396,631, Case IPR2017-00345, Nov. 22, 2016, pp. 1-92.
Declaration of Thaine H. Allison III for U.S. Pat. No. 9,478,110, Case IPR2017-01900, Jul. 25, 2017, pp. 1-93.
Declaration of Thaine H. Allison III, for U.S. Pat. No. 9,478,110, Case IPR2017-01901, dated Jul. 27, 2017, pp. 1-117.
Declaration of Thaine H. Allison, III for U.S. Pat. No. 8,884,762, Case IPR2016-00892, filed Apr. 11, 2016, pp. 1-116.
Declaration of Thaine H. Allison, III for U.S. Pat. No. 9,135,800, Case IPR2016-00895, Filed Apr. 11, 2016, pp. 1-115.
Declaration of Thaine H. Allison, III for U.S. Pat. No. 9,135,800, Case IPR2016-00896, Filed Apr. 11, 2016, pp. 1-103.
Declaration of Thaine H. Allison, III, U.S. Pat. No. 7,737,844, Case IPR2016-01915, filed Jul. 30, 2016, pp. 1-117.
Declaration of Thaine H. Allison, III, U.S. Pat. No. 7,737,846, Case IPR2016-01241, Jun. 15, 2016, pp. 1-104.
Deposition of Thaine Allison, III, taken in behalf of Petition, dated Feb. 24, 2014, U.S. Pat. No. 7,909,641, Case IPR2013-00122, pp. 1-198.
Excerpts from Bruce Schneier, Applied Cryptography: Protocols, Algorithms, and Source Code in C, 1994, 14 pages.
International Search Report and Written Opinion for PCT/US2011/037235 dated Oct. 21, 2011.
Mobile Tech Inc.'s Reply to Patent Owner's Response of U.S. Pat. No. 7,737,846, Case IPR2016-01241, May 15, 2017, pp. 1-29.
Mobile Tech Inc.'s Reply to Patent Owner's Response of U.S. Pat. No. 8,884,762, Case IPR2016-00892, filed Apr. 13, 2017, pp. 1-30.
Mobile Tech Inc.'s Reply to Patent Owner's Response of U.S. Pat. No. 9,135,800, Case IPR2016-00895, filed Apr. 13, 2017, pp. 1-32.
Mobile Tech Inc.'s Reply to Patent Owner's Response of U.S. Pat. No. 9,269,247, Case IPR2016-00899, Apr. 13, 2017, pp. 1-31.
Mobile Tech Inc.'s Reply to Patent Owner's Response, Inter Partes Review of U.S. Pat. No. 9,269,247, Case IPR2016-00898, Apr. 13, 2017, pp. 1-31.

(56) References Cited

OTHER PUBLICATIONS

MTI 2008 PowerPoint, "Vanguard Program" (Exhibit 1005 of Declaration of Mike Cook), pp. 1-9.
MTI Freedom Universal 2.0 Product Manual, Dec. 2008, pp. 1-21.
Patent Owner's Preliminary Response of U.S. Pat. No. 7,737,844, Case IPR2016-01915, filed Jan. 4, 2017, pp. 1-43.
Patent Owner's Preliminary Response of U.S. Pat. No. 7,737,846, Case IPR2016-01241, Sep. 30, 2016, pp. 1-62.
Patent Owner's Preliminary Response of U.S. Pat. No. 8,884,762, Case IPR2016-00892, filed Jul. 18, 2016, pp. 1-53.
Patent Owner's Preliminary Response of U.S. Pat. No. 9,135,800, Case IPR2016-00895, Filed Jul. 18, 2016, pp. 1-62.
Patent Owner's Preliminary Response of U.S. Pat. No. 9,135,800, Case IPR2016-00896, Filed Jul. 18, 2016, pp. 1-56.
Patent Owner's Preliminary Response of U.S. Pat. No. 9,269,247, Case IPR2016-00898, Jul. 19, 2016, pp. 1-57.
Patent Owner's Preliminary Response of U.S. Pat. No. 9,396,631, Case IPR2017-00344, dated Mar. 20, 2017, pp. 1-42.
Patent Owner's Preliminary Response of U.S. Pat. No. 9,396,631, Case IPR2017-00345, dated Mar. 20, 2017, pp. 1-35.
Patent Owner's Preliminary Response, U.S. Pat. No. 9,269,247, Case IPR2016-00899, dated Jul. 19, 2016, pp. 1-54.
Patent Owner's Response of U.S. Pat. No. 8,884,762, Case IPR2016-00892, filed Jan. 18, 2017, pp. 1-42.
Patent Owner's Response of U.S. Pat. No. 7,737,844, Case IPR2016-01915, filed Jul. 12, 2017, pp. 1-38.
"Cabinet Lock", accessed from https://web.archive.org/web/20041016145022/https://intellikey.com/cabinet.htm, dated Oct. 16, 2004, accessed Jun. 23, 2016, 1 page.
"Cylinders", accessed from https://web.archive.org/web/20041016151707/http://intellikey.com/cylinders.htm, dated Oct. 16, 2004, accessed Jun. 23, 2016, 1 page.
"Cylindrical Lock", accessed from https://web.archive.org/web/20041225181341/http://intellikey.com/cylindrical.htm, dated Dec. 25, 2004, accessed Jun. 23, 2016, 1 page.
"EZ 123 Demo", accessed from https://web.archive.org/web/19990422192601/http://www.intellikey.com/Downloads/Quantum/QuantumDemo.html, dated Apr. 22, 1999, accessed Jun. 23, 2016, 1 page.
"EZ123", accessed from https://web.archive.org/web/20041016172233/http://intellikey.com/ez123.htm, dated Oct. 16, 2004, accessed Jun. 23, 2016, 1 page.
"Gate Lock", accessed from https://web.archive.org/web/20041226222338/http://intellikey.com/gatelock.htm, dated Dec. 26, 2004, accessed Jun. 23, 2016, 1 page.
"Intelligent Key", accessed from https://web.archive.org/web/20001009070818/http://www.intellikey.com/prod_key.html, dated Oct. 9, 2000, accessed Jun. 23, 2016, 2 pages.
"Intellikey—Product Gallery", accessed from https://web.archive.org/web/19970101150529/http://intellikey.com/products.html, dated Jan. 1, 1997, accessed Jun. 23, 2016, 4 pages.
"Intellikey Controller", accessed from https://web.archive.org/web/20041017140614/http://intellikey.com/controller.htm, dated Oct. 17, 2004, accessed Jun. 23, 2016, 1 page.
"Intellikey Key", accessed from https://web.archive.org/web/20041017122940/http://intellikey.com/key.htm, dated Oct. 17, 2004, accessed Jun. 23, 2016, 1 page.
"Key Processing Unit", accessed from https://web.archive.org/web/20041017124515/http://intellikey.com/kpu.htm, dated Oct. 17, 2004, accessed Jun. 23, 2016, 1 page.
"Key Programming Unit", accessed from https://web.archive.org/web/20021115195312/http://www.intellikey.com/site/keyProgrammingUnit.htm, dated Nov. 15, 2002, accessed Jun. 23, 2016, 1 page.
"Lock Programming Unit", accessed from https://web.archive.org/web/20021115200156/http://www.intellikey.com/site/lockProgrammingUnit.htm, dated Nov. 15, 2002, accessed Jun. 23, 2016, 1 page.
"Lock Programming Unit", accessed from https://web.archive.org/web/20041017130030/http://intellikey.com/lpu.htm, dated Oct. 17, 2004, accessed Jun. 23, 2016, 1 page.
"Pad-e-Lock", accessed from https://web.archive.org/web/20041017131156/http://intellikey.com/padelock.htm, dated Oct. 17, 2004, accessed Jun. 23, 2016, 1 page.
"Products", accessed from https://web.archive.org/web/20041213212916/http://intellikey.com/products.htm, dated Dec. 13, 2004, accessed Jun. 23, 2016, 1 page.
"Quantum", accessed from https://web.archive.org/web/20041017132045/http://intellikey.com/quantum.htm, dated Oct. 17, 2004, accessed Jun. 23, 2016, 1 page.
"System 1000", accessed from https://web.archive.org/web/20001009123951/http://web.intellikey.com/prod_sys1k.html, dated Oct. 9, 2000, accessed Jun. 23, 2016, 3 pages.
"System Overview", accessed from https://web.archive.org/web/20041213055854/http://www.intellikey.com/systems.htm, dated Dec. 13, 2004, accessed Jun. 23, 2016, 4 pages.
"Technology", accessed from https://web.archive.org/web/20041213214001/http://intellikey.com/technology.htm, dated Dec. 13, 2004, accessed Jun. 23, 2016, 1 page.
English Translation of JP 1997-259368, Oct. 3, 1997.
Final Written Decision, Inter Partes Review Case IPR2016-00892, U.S. Pat. No. 8,884,762 B2, Sep. 28, 2017, 71 pages.
Final Written Decision, Inter Partes Review Case IPR2016-01241 U.S. Pat. No. 7,737,846 B2, Dec. 19, 2017, 34 pages.
Final Written Decision, Inter Partes Review Case IPR2016-01915, U.S. Pat. No. 7,737,844 B2, Mar. 28, 2018, 51 pages.
Final Written Decision, Inter Partes Review Cases IPR2016-00895 and IPR2016-00896, U.S. Pat. No. 9,135,800 B2, Oct. 12, 2017, 82 pages.
Final Written Decision, Inter Partes Review Cases IPR2016-00898 and IPR2016-00899, U.S. Pat. No. 9,269,247 B2, Sep. 28, 2017, 78 pages.
Final Written Decision, Inter Partes Review Cases IPR2017-00344 and IPR2017-00345, U.S. Pat. No. 9,396,631 B2, May 24, 2018, 94 pages.
Final Written Decision, Inter Partes Review Cases IPR2017-01900 and IPR2017-01901, U.S. Pat. No. 9,478,110 B2, Feb. 12, 2019, 71 pages.
International Search Report and Written Opinion for PCT/US2017/027798 dated Jul. 6, 2017.
Prosecution History for U.S. Appl. No. 16/152,085, now U.S. Pat. No. 10,269,202, filed Oct. 4, 2018.

\* cited by examiner

GATEWAY-BASED ANTI-THEFT SECURITY SYSTEM AND METHOD

CROSS-REFERENCE AND PRIORITY CLAIM TO RELATED PATENT APPLICATIONS

This patent application claims priority to U.S. provisional patent application Ser. No. 62/323,511, filed Apr. 15, 2016 and entitled "Alarm Key System for Retail Security Display", the entire disclosure of which is incorporated herein by reference.

This patent application also claims priority to U.S. provisional patent application Ser. No. 62/323,466, filed Apr. 15, 2016 and entitled "Security Alarm Key for Retail Security Display", the entire disclosure of which is incorporated herein by reference.

INTRODUCTION

Many products such as electronic devices (particularly hand-held electronics such as smart phones, tablet computers, digital cameras, etc.) are displayed in retail stores at individual post positions on countertop or wall-rack displays. A product display assembly at each post position is typically employed to facilitate the presentation of these products to customers. The product display assembly typically includes a puck assembly and a base assembly. A product such as an electronic device is mounted on a surface of the puck assembly, and the puck assembly engages with the base assembly when the puck assembly is at rest. To accommodate a capability for a customer to hold or take a closer look at the electronic device, the puck assembly can be lifted from its rest position. A tether may be employed to keep the puck assembly connected with the base assembly when the puck assembly is in the lift position, but this need not necessarily be the case.

Product display assemblies typically include security systems that will trigger alarms when actions such as an improper removal of the product from the puck assembly or an improper movement of the puck assembly occur. These security systems are often configured to be switchable between an armed state and a disarmed state. When in an armed state, the security system will trigger an alarm when unauthorized actions occur. When in a disarmed state, the security system is disabled.

Hand-carried keys have been developed that allow retail store personnel to arm or disarm the security systems of the product display assemblies. These keys can be referred to as "key fobs" or "security fobs". With a conventional security fob, the security fob and the product display assembly are programmed to have matching codes (an "arm/disarm" code). This programmable code effectively turns the security fob into an electronic key that fits an electronic lock on the product display assembly so that the security fob can arm or disarm the product display assembly's security system.

However, this conventional approach to security fobs results in a practical problem that relates to the turnover in personnel at a retail store. To reduce the risk of a security fob being used in an unauthorized manner, retail store managers desire a mechanism for controlling which security fobs are authorized to control the security states of one or more product display assemblies. As an example, when an employee discontinues employment, a store manager will need to delete, reset, and/or reprogram the code in the security fob that had been used by that discontinued employee. A similar reprogramming effort may be needed for the product display assemblies in the store as well. Given the relative frequency of changes in store personnel, this need for frequent reprogramming efforts leads to inefficiency.

To solve these problems of inefficiency, disclosed herein are solutions where authentication tasks are performed by a computer system such as a server that is remote from the security fobs and the product display assemblies. A security fob that is to be used for controlling the security status of a product display assembly can communicate its identifier to the computer system, whereupon the computer system will make a determination based on the communicated identifier as to whether the security fob is authorized for controlling the product display assembly's security status. The computer system can maintain a list of authorized security fob identifiers to facilitate this authentication task. If the computer system determines that the security fob is authorized, an authorization signal can be provided to the security fob that will cause the security fob to provide a code to the product display assembly that is effective to control the product display assembly's security status. In this fashion, the computer system can serve as an authentication gateway for security fobs.

Moreover, with respect to an example embodiment, the product display assemblies need not necessarily know the identifiers for the authorized security fobs. Instead, the same common code for controlling security status can be shared by multiple security fobs and used to control security status for a plurality of product display assemblies. When the need arises to de-authorize an existing security fob or authorize a new security fob, these acts can be accomplished by updating the authorization list that is maintained by the computer system. Accordingly, the nature of interactions between security fobs and product display assemblies need not change as the population of authorized security fobs changes.

Also disclosed herein is a technique for permitting a security fob to perform a limited number of security control operations with respect to a product display assembly regardless of whether there has been an authentication of that security fob by the computer system. As an example, one or more override tokens can be stored on a security fob. If the security fob is unable to establish a communication link with the computer system, the security fob can still provide the security code to the product display assembly so long as it has at least one stored override token. Each time an override token is used in this manner, the security fob would decrement its count of override tokens. Such an arrangement provides a level of failsafe operations when there is a need to control the security status of a product display assembly in situations when a wireless network or the like that links the security fobs with the computer system might be down.

These and other features and advantages of the present invention will be described hereinafter to those having ordinary skill in the art.

DETAILED DESCRIPTION OF EXAMPLE EMBODIMENTS

Figure 1:
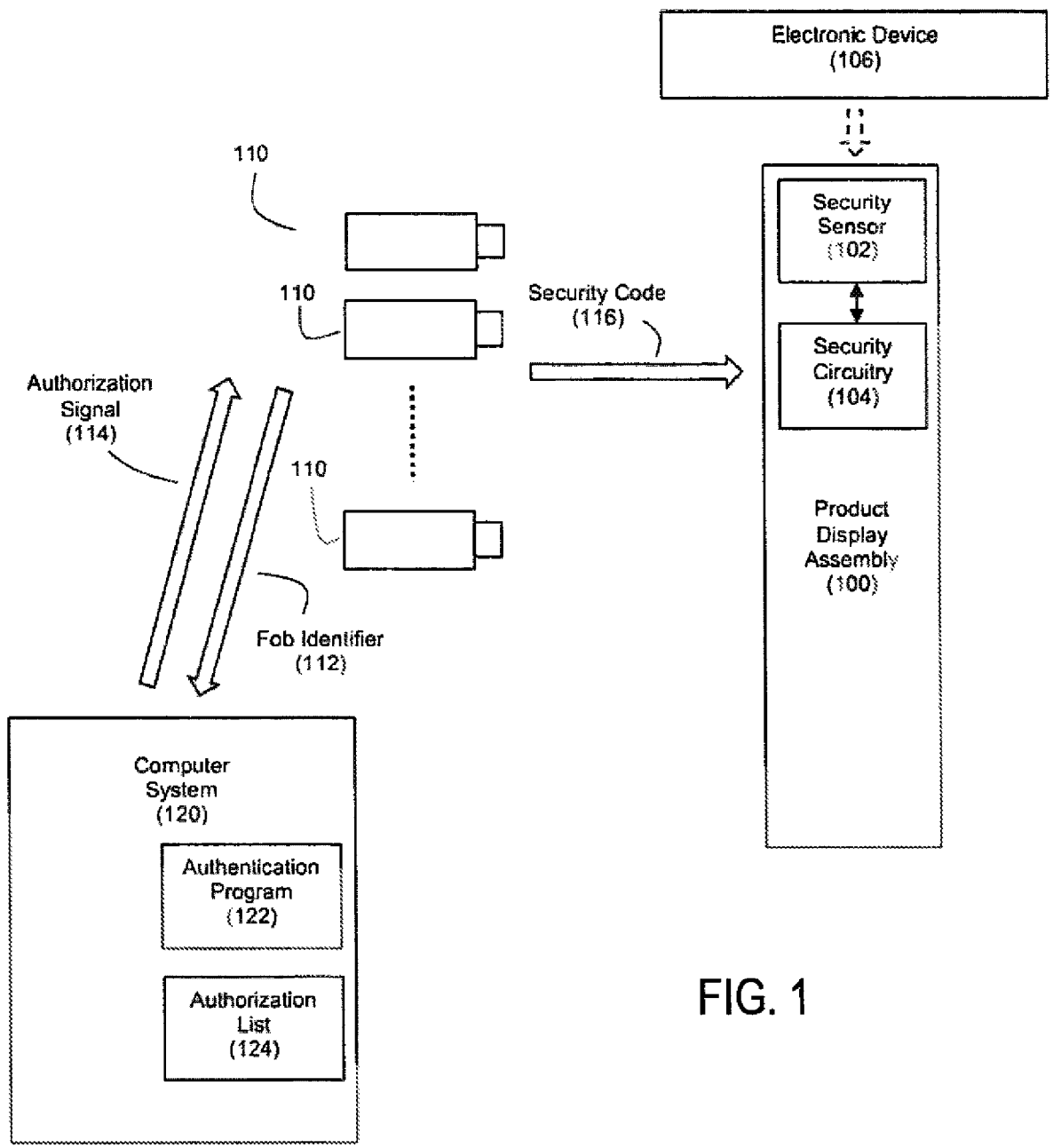
FIG. 1 discloses an example embodiment of a gateway-based authorization system for security fobs.

FIG. 1 discloses an example embodiment of a gateway-based authorization system for security fobs. The system can include a product display assembly 100 for cooperation with one or more security fobs 110 and a computer system 120.

The product display assembly 100 can serve as an anti-theft security system, and it can be used for presenting a product such as an electronic device 106 to consumers in a secure manner. As mentioned, examples of suitable electronic devices 106 can include hand-held consumer electronics such as smart phones, tablet computers, digital cameras, etc. The product display assembly 100 can include a security sensor 102 and security circuitry 104 that cooperate with each other to generate a security condition signal in response to detecting an event relating to a removal of the electronic device 106 from the product display assembly 100. The security circuitry 104 is controllable to be switchable between an armed state and a disarmed state based on receipt of a security code 116 from a security fob 110.

It should be understood that the security code 116 does not serve to uniquely identify a security fob 110. Instead, the security code 116 is a code that controls a security status for the security circuitry 104, where this security code 116 can be shared by several security fobs 110. As an example, the security code 116 can be a single toggle code that toggles the security circuitry 104 between an armed state and a disarmed state. However, the security code 116 may take the form of different codes based on a desired function (e.g., a first code for arming the security circuitry 104, a second code for disarming the security circuitry 104, etc.) if desired by a practitioner. Thus, it should be understood that security fobs 110 shown in FIG. 1 can be configured to generate a common security code 116 for use in controlling a security status for the security circuitry 104. As such, the security code 116 can be characterized as a security command that is used to control the security circuitry 104.

To authenticate security fobs, a computer system 120 is employed to communicate with the security fobs 110 and execute an authentication program 122. Each security fob can communicate an identifier 112 for that security fob to the computer system 120, and the computer system 120 can execute its authentication program 122 that matches the received fob identifier 112 against one or more fob identifiers on an authorization list 124. If the received fob identifier 112 matches a fob identifier on the authorization list 124, this means that the security fob in question is an authorized security fob, and the computer system 120 can communicate an authorization signal 114 to that security fob 110. In response to receipt of the authorization signal 114, the security fob 110 provides the security code 116 to the security circuitry 104. Accordingly, it should be understood that the security fob 110 is configured to condition its output of the security code 116 on receipt of an authorization signal 114 from the computer system 120.

In this fashion, the product display assembly 100 need not receive or process any unique identifiers for security fobs in order to assess whether a security fob is authorized to control the security status for the security circuitry 104. To control which security fobs 110 are authorized to control security status, a user needs to only update the authorization list 124 maintained by the computer system 120. Thus, as employees start or discontinue their employment at a retail store, no changes need to be made to the manner by which the security fobs 110 interact with the product display assembly 100 (e.g., the same security code 116 can continue being used); a manager needs to only change which security fob identifiers are included in the authorization list 124.

Figure 2:
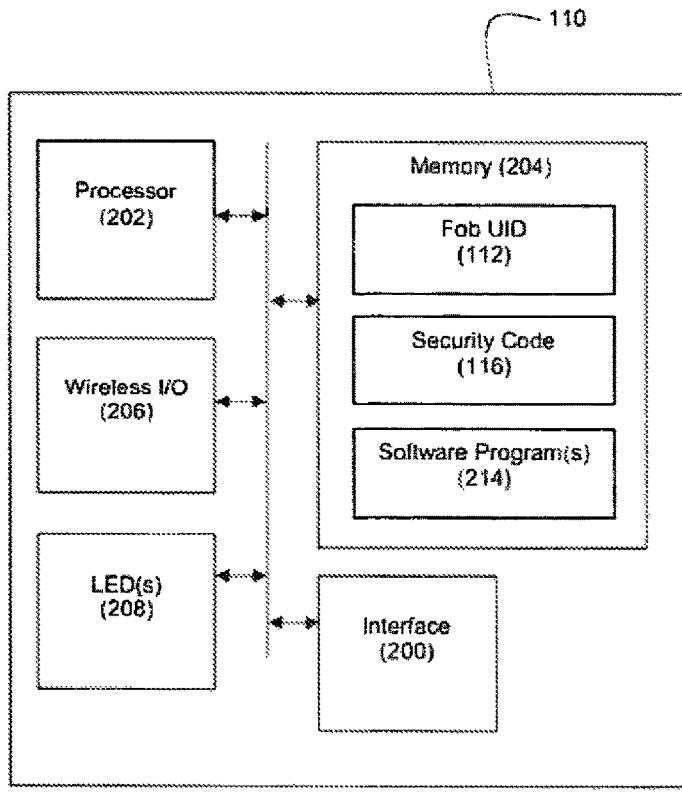
FIG. 2 shows an example embodiment of a security fob.

FIG. 2 shows an example embodiment of a security fob 110. The security fob 110 can take the form of a hand-held object that is capable of communicating with a product display assembly 100 and the computer system 120. The security fob can exhibit any of a number of shapes as would be understood by a practitioner. For example, the security fob 110 can be shaped in a manner similar to small hand-held thumb drives and the like. As another example, the security fob 110 can be shaped in a manner similar to a disk, a cylinder, or keyless entry devices for vehicles. In still other example embodiments, the security fob 110 can take the form of a badge or card or even a wireless computing device such as a smart phone or tablet computer (examples of which are discussed below).

The security fob 110 can include an interface 200, processor 202, memory 204, wireless I/O 206, and one or more lights 208 such as one or more light emitting diodes (LEDs), each enclosed or partially enclosed within a housing of some fashion such as a plastic or composite shell. These components can be configured to communicate with each other over a bus or similar interconnection. Furthermore, it should be understood that the security fob 110 need not necessarily include all of the components shown in FIG. 2; for example, a practitioner may choose to employ a security fob that does not include any light(s) 208. Likewise, it should also be understood that the security fob 110 may include additional components not shown in FIG. 2 (e.g., a power storage device such as a battery and/or one or more capacitors may be included with the security fob 110; and/or user input devices such as one or more buttons, etc. may be included with the security fob 110).

Through interface 200, the security fob 110 can communicate with the product display assembly 100. As an example, the interface 200 can be a physical connector for detachably connecting the security fob 110 with the product display assembly 100. As another example, the interface 200 can be a wireless connector for wirelessly connecting the security fob 110 with the product display assembly. The interface 200 can be any type of interface suitable for interfacing the security fob 110 with a complementary interface of the product display assembly 100 for the purposes described herein. For example, in embodiments where the interface 200 is a physical connector, this physical connector can be a physical connector that is compliant with a standard such the Universal Serial Bus (USB) standard (e.g., a mini-USB connector).

The processor 202 and memory 204 can be any hardware devices suitable for performing the operations described herein. As an example, the processor 202 can take the form of an Atmel SAMD21 microprocessor. The memory 204 can be integral to processor 202 and/or external to the processor 204.

The memory 204 can store the identifier 112 for the security fob 110. This identifier 112 is preferably a unique identifier (UID) that distinguishes the subject security fob 110 from other security fobs 110 within the system. This uniqueness can be uniqueness across a system such as within a given retail store or it can be uniqueness across a wider system (e.g., a chain of retail stores). At its widest extent, the uniqueness can be universal, in which case the UID can take the form of a universal UID (UUID). An example UUID code can be a multi-bit code (e.g., a 128-bit code), with a certain number (or set) of bits allocated to identify the manufacturer, another set of bits allocated to other information (for example, the time or date that the UUID code was burned onto the memory chip), and a third set of bits allocated for expressing a uniquely generated random number. Accordingly, the fob UUID 112 operates like a unique serial number and specifically identifies only one security fob 110.

The memory 204 can also store the security code 116. As noted above, the security code 116 is a code that controls a security status for the security circuitry 104. An example security code 116 can be a multi-bit code that is known by the security circuitry 104 such that receipt of the security code 116 by the security circuitry 104 from the security fob 110 causes a change in the security status of the security circuitry 104. In an example embodiment, the security code 116 can be a single code that toggles the security status of the security circuitry 104 (a "toggle" code, e.g., for toggling the security circuitry 104 between an armed state and a disarmed state). However, as explained above, it should be understood that the security code 116 could also take the form of different codes based on a desired function. For example, the security code 116 could include a first code for arming the security circuitry 104 and a second code for disarming the security circuitry 104). User control over which code is being used at a given time can be provided through a button or the like on the security fob 110. As another example, the security code 116 could also include a third code for clearing an alarm for the security circuitry. As yet another example, the security code 116 could include a first code for toggling between arming and disarming the security circuitry 104 and a second code for clearing an alarm for the security circuitry.

It should be understood that, unlike the fob identifiers 112 which will be different for each security fob 110 in the system, the security code 116 can be shared by all of the security fobs 110 in the system. Accordingly, because the security code 116 can be shared by multiple security fobs 110, there will be a minimal, negligible, or even non-existent need to reprogram the security fobs 110 and/or product display assemblies 100 with respect to the security code 116 as employees begin or end employment with a store.

The memory 204 can also store one or more software programs 214 for execution by processor 202. The software program(s) 214 can take the form of a plurality of processor-executable instructions that are resident on a non-transitory computer-readable storage medium such as memory 204. Example embodiments of software programs 214 are described below with reference to FIGS. 6, 12, and 15. Of note, software program 214 can be configured to condition any release or output of the security code 116 by the security fob 110 on the security fob receiving an appropriate authorization signal as discussed hereinafter.

The wireless I/O 206 provides wireless connectivity with remote systems such as computer system 120. The wireless I/O 206 can be any wireless communication device suitable for performing the operations described herein. As an example, the wireless I/O 206 can take the form of an Atmel AT86RF212B RF transceiver. Wireless transmissions can operate in any frequency range suitable for wireless communications. As an example, the wireless transmissions can operate in the 902 Mhz to 928 Mhz band which can enhance range and penetration. An example embodiment of a wireless network used by the system can support multiple channels (e.g., 10 channels with 2Meg bandwidths) for optional environmental interference tweaking.

The light(s) 208 can take the form of any light source suitable for performing the operations described herein. As an example, the light(s) 208 can be a single LED that becomes illuminated whenever the security fob 110 successfully controls the security status of the security circuitry 104. As another example, the light(s) 208 can be multiple LEDs (which may be LEDs of different colors) that will be used to indicate to a user whether the security fob has been approved as an authorized security fob by computer system 120 (an illumination of a first LED) and to indicate a successful controlling action with respect to the security circuitry 104 (an illumination of a second LED). It should be understood that other combinations are possible to indicate different events if desired by a practitioner.

Figures 3A, 3B, 3C:
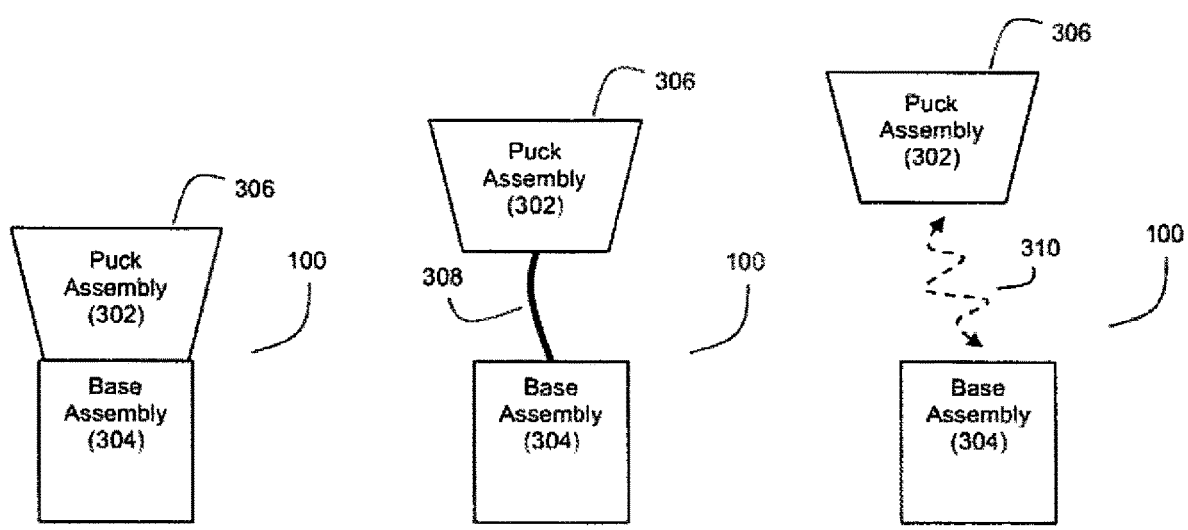
FIGS. 3A-F show example embodiments of a product display assembly.

FIGS. 3A-C show various example embodiments of different types of product display assemblies 100 that can be used with the system. As noted above, the product display assembly 100 can include a puck assembly 302 and a base assembly 304. Electronic device 106 can be mounted on surface 306 of the puck assembly 302 so that the electronic device 106 can be securely displayed to customers in a store. The puck assembly 302 is moveable between a rest position and a lift position. When in the rest position, the puck assembly 302 contacts the base assembly 304, as shown in FIG. 3A. When in the lift position, the puck assembly 302 separates from the base assembly 304, as shown by FIGS. 3B and 3C. FIG. 3B shows an example embodiment where a tether assembly 308 is used to physically connect the puck assembly 302 with the base assembly 304, even when the puck assembly 302 is in the lift position. A security condition signal (e.g., to indicate an unauthorized removal of electronic device 106 from the puck assembly 302) can be communicated from the puck assembly 302 via the tether assembly 308 or via wireless communication (with the base assembly 304 or with some other system). FIG. 3C shows an example embodiment of a tetherless product display assembly 100. With the example of FIG. 3C, wireless communication 310 can be used to communicate a security condition signal from the puck assembly 302 to the base assembly 304 (or to some other system).

Examples of product display assemblies 100 that can be adapted for use in the practice of the embodiments described herein are disclosed in U.S. Pat. Nos. 8,558,688, 8,698,617, and 8,698,618 and U.S. Patent Application Publication Nos. 2014/0159898 and 2017/0032636, the entire disclosures of each of which are incorporated herein by reference.

Figure 3D:
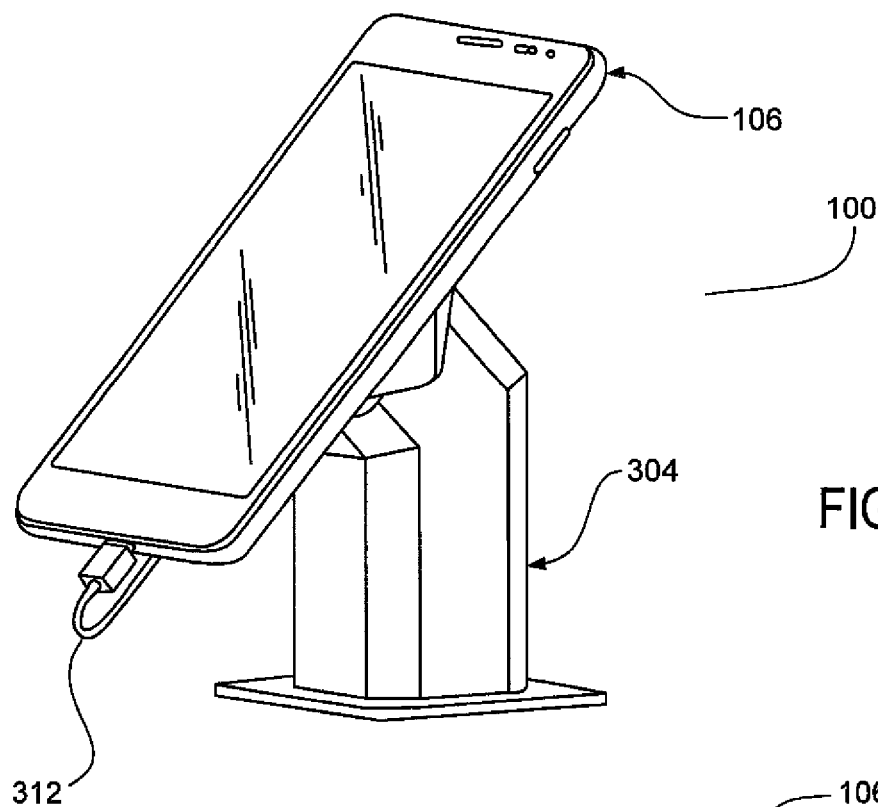
Figure 3E:
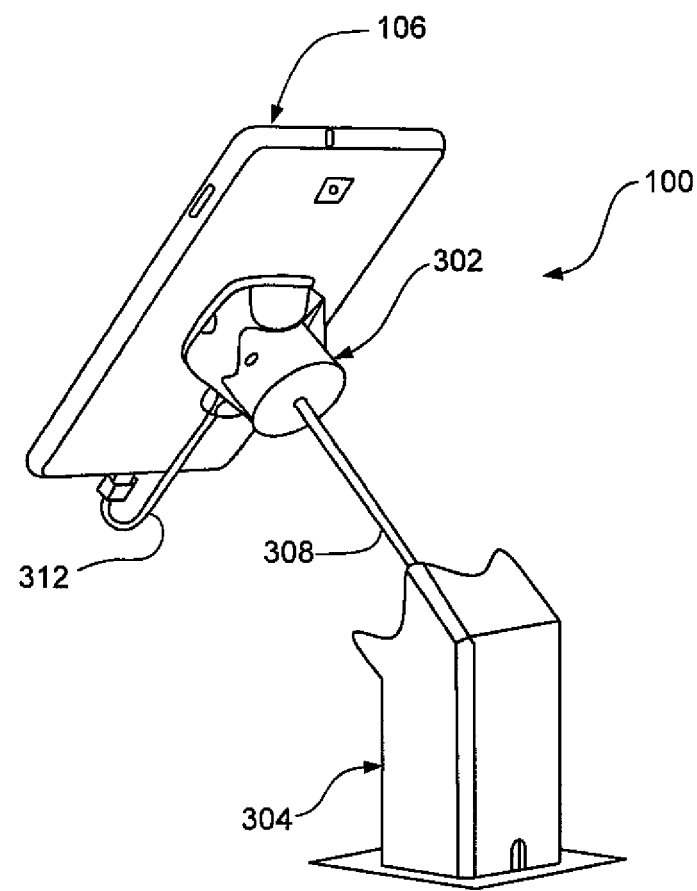

For example, FIGS. 3D and 3E reproduce FIGS. 27 and 28 from incorporated U.S. Patent Application Publication No. 2017/0032636 and show an example product display assembly 100 that is further described in the 2017/0032636 publication. The product display assembly 100 shown by FIGS. 3D and 3E include a puck assembly 302, a base assembly 304, and a tether assembly 308. A power cable 312 provides an electrical connection between the puck assembly 302 and the electronic device 106 through which the electronic device 106 can be charged. The puck assembly 302 can receive power from a power source via the base assembly 304 when the puck assembly is at rest, as shown in FIG. 3D. Contacts included on the puck assembly and base assembly (see, e.g., contact 314 shown by FIG. 3E) can contact each other when the puck assembly is at rest, thereby forming an electrical connection through which power can be delivered from a power source (not shown) to the puck assembly via the base assembly and the electrical connection formed by the contacts. When the puck assembly 302 is lifted, the contacts lose contact with each other, thereby breaking the electrical connection. Optionally, a battery or other power storage device can be included in the puck assembly 302 to store power for use by the puck assembly 302 when the puck assembly is in the lift position.

Figure 3F:
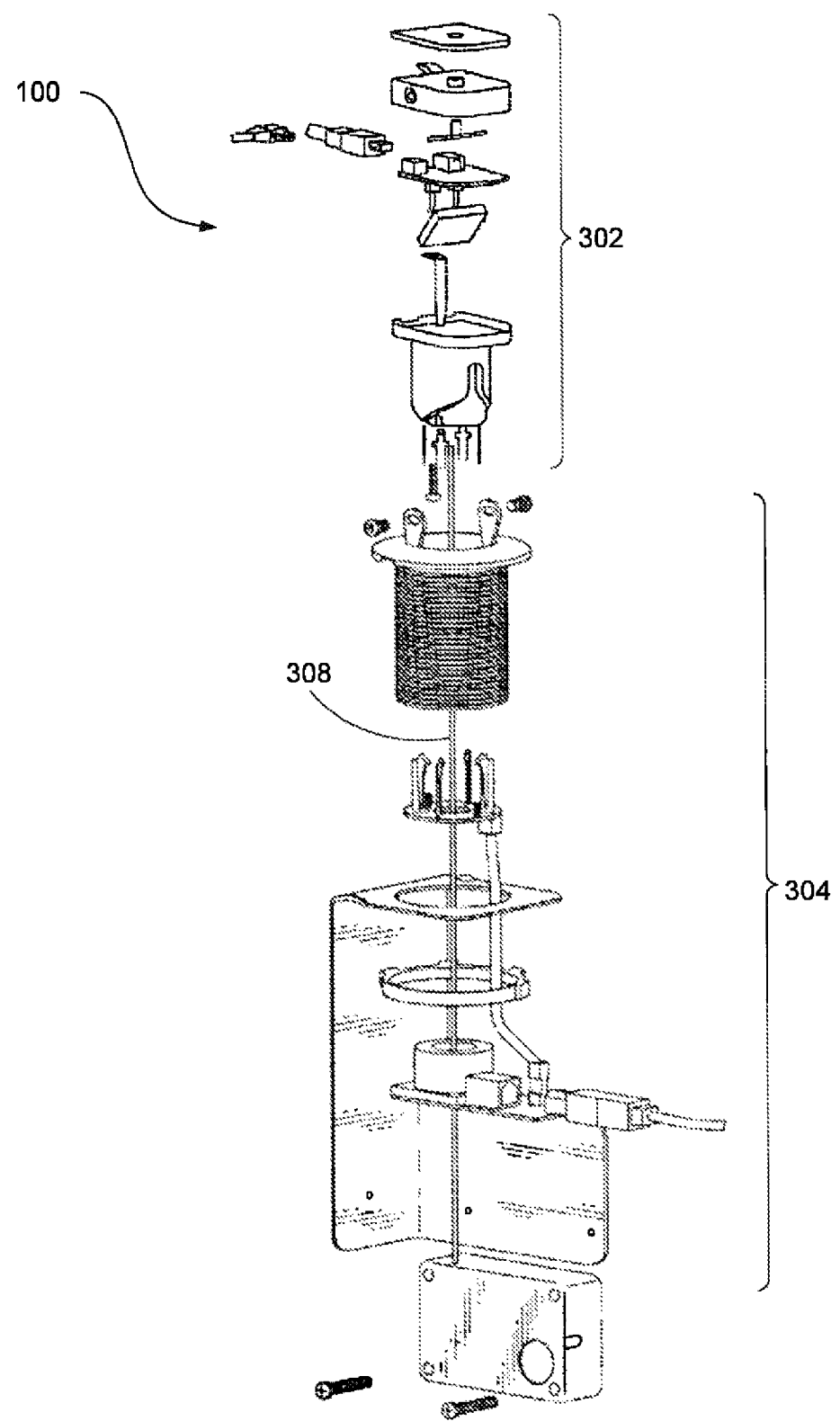
Figure 8:
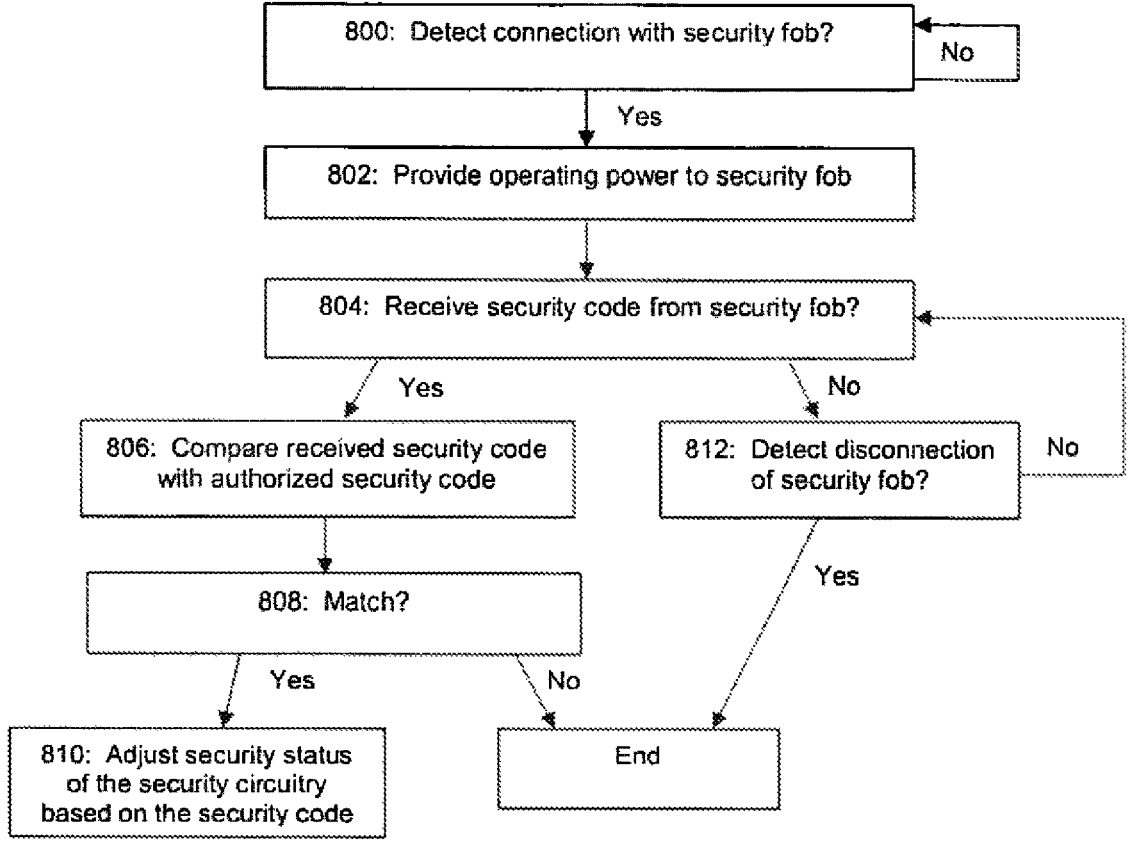
FIG. 8 depicts an example process flow for execution at least in part by a processor within security circuitry to control security status for a product display assembly in response to a security fob.

As another example, FIG. 3F reproduces FIG. 8 from incorporated U.S. Pat. No. 8,698,617 and shows an example product display assembly 100 that is further described in the '617 patent. In this view, an example product display assembly 100 is shown in an exploded manner where various components of a puck assembly 302, a base assembly 304, and a tether assembly 308 can be seen.

Figure 3G:
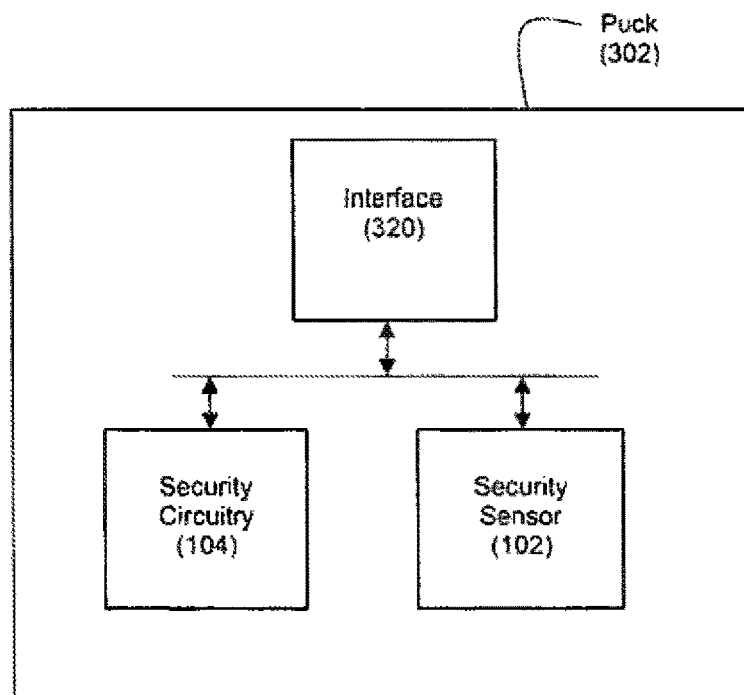
FIGS. 3G-H show example embodiments of a puck assembly.

FIG. 3G depicts an example puck assembly 302 that includes an interface 320, security sensor 102, and security circuitry 104. These components can each be enclosed or partially enclosed within a housing of some fashion such as a plastic or composite shell. These components can also be configured to communicate with each other over a bus or similar interconnection.

Interface 320 is for interfacing a security fob 110 with the puck assembly 302. Interface 320 can be an interface type that is complementary with the interface 200 of the security fob 110. For example, if the interface 200 is mini-USB connector, then interface 320 can be a complementary mini-USB connector. As another example, if the interface 200 is an RFID chip, the interface 320 can be an RFID reader.

The security sensor 102 can be one or more sensors that are adapted to detect events such as a removal of the electronic device 106 from the puck assembly 302 or other events that may indicate a possible security condition. An example security sensor 102 can be a pressure button included on the puck assembly surface 306 that is depressed when the electronic device 106 is engaged with the puck assembly 302 but is released when the electronic device 106 is removed from the puck assembly 302. A release of the pressure button can trigger the security circuitry 104 (when armed) to generate a security conditional signal. However, it should be understood that other security sensors 102 could be employed. Another example of a security sensor 102 that can be used with product display assemblies 100 that include a tether assembly 308 can be a circuit that detects when the tether is cut or otherwise broken. Still another example of a security sensor 102 can be a position detection circuit that detects when the puck assembly 302 moves a certain distance beyond the base assembly or leaves a designated virtual fence area. For example, such a position detection circuit can rely on wireless signals and signal strength estimations to detect distances between the puck assembly 302 and base assembly 304. Still additional examples of security sensors 102 can include power draw sensors, contact closures, optical sensors for detecting objects (or the absence of objects), vibration sensors, and/or acceleration sensors.

The security circuitry 104 can be any circuitry that is configured to be (1) controllable between a plurality of security states in response to the security code 116 and (2) generate a security condition signal when appropriate (e.g., when the security circuitry 104 is in an armed state and the security sensor 102 detects a triggering event). For example, the security circuitry 104 can include switching logic and the like that is controlled based on a signal from a control processor that controls the switching logic based on whether the security code 116 has been verified. The security circuitry 104 may also include circuitry such as relay drivers, motor controls, alarming units, solenoid drivers, and/or lock actuators. Security circuitry 104 can include a processor and memory that cooperate with each other to execute one or more software programs in furtherance of the security functions described herein. Examples of such software programs are described below with reference to FIGS. 8, 13, and 16.

Figure 3H:
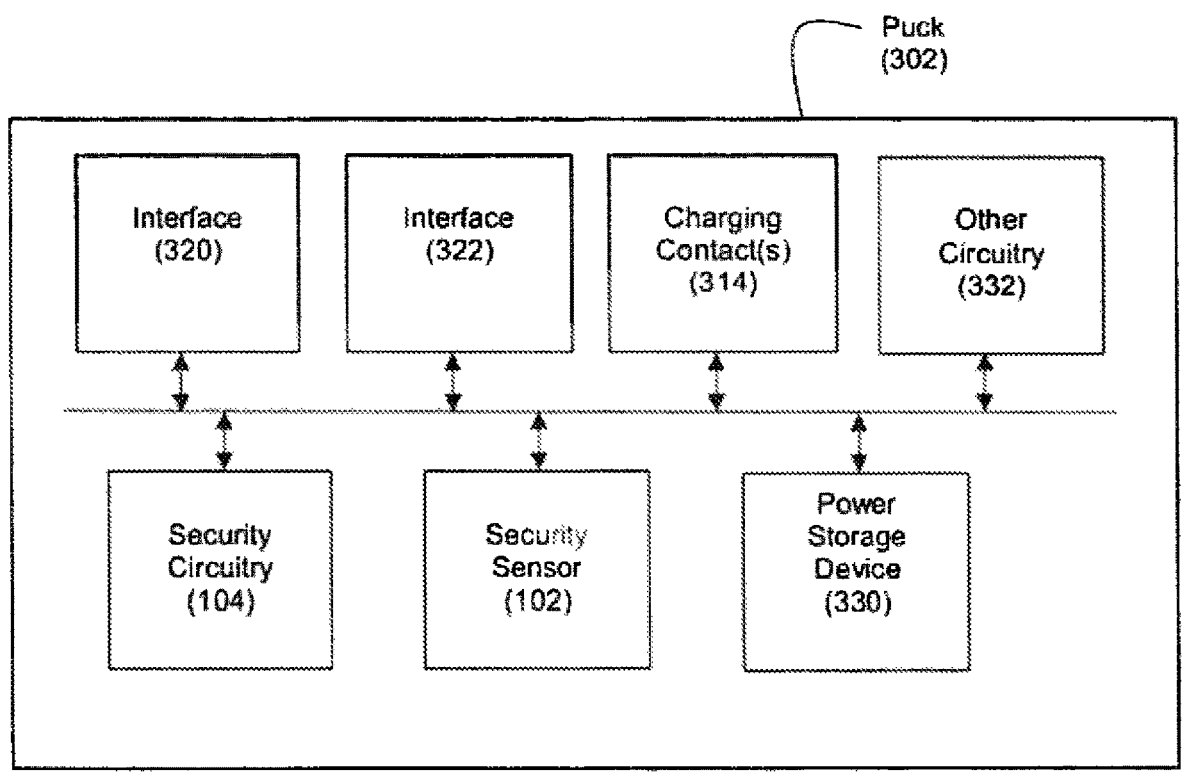

It should be understood that the puck assembly 302 can include components different than those shown in FIG. 3G. For example, FIG. 3H shows an example puck assembly 302 that includes additional components. The puck assembly 302 of FIG. 3H includes an additional interface 322. This interface 322 can interface the puck assembly 302 with an electronic device 106 presented to customers via the product display assembly 100. For example, the interface 322 can be a physical connector adapted for detachable connection with a power cable for providing power to the electronic device 116. Examples of such power cables are described in the above-referenced and incorporated U.S. Pat. Nos. 8,558, 688, 8,698,617, and 8,698,618 and U.S. Patent Application Publication Nos. 2014/0159898 and 2017/003263. The puck assembly 302 of FIG. 3H also includes one or more charging contacts 314.

These charging contacts 314 can create an electrical connection with a power source via complementary contacts of the base assembly 304 when the puck assembly 302 is in the rest position. Examples of such charging contacts 314 are described in the above-referenced and incorporated U.S. Pat. Nos. 8,558,688, 8,698,617, and 8,698,618 and U.S. Patent Application Publication Nos. 2014/0159898 and 2017/003263.

The puck assembly 302 of FIG. 3H also includes a power storage device 330 that is charged via electricity received through the charging contacts 314 when the puck assembly 302 is in the rest position and that stores power for use by the puck assembly 302 when the puck assembly is in the lift position. The power storage device 330 can take the form of a battery (preferably a rechargeable battery) or a suitable capacitor. Examples of such a power storage device 330 are described in the above-referenced and incorporated U.S. Pat. Nos. 8,558,688, 8,698,617, and 8,698,618 and U.S. Patent Application Publication Nos. 2014/0159898 and 2017/003263.

The puck assembly 302 of FIG. 3H can also include additional circuitry 332. For example, the additional circuitry 332 can include circuitry for distributing power from the charging contacts 314 to other components of the puck assembly 302 (e.g., the security circuitry 104, interfaces 320 and 322, power storage device 330, etc.) and/or circuitry for distributing power from the power storage device 330 to other components of the puck assembly 302 (e.g., the security circuitry 104; interfaces 320 and 322). As another example, the additional circuitry 332 can include wireless communication circuitry that provides the puck assembly with an ability to wirelessly transmit security condition signals from the security circuitry 104 or otherwise wirelessly communicate with remote systems. Examples of additional circuitry 332 are described in the above-referenced and incorporated U.S. Pat. Nos. 8,558,688, 8,698,617, and 8,698,618 and U.S. Patent Application Publication Nos. 2014/0159898 and 2017/003263.

Figure 4:
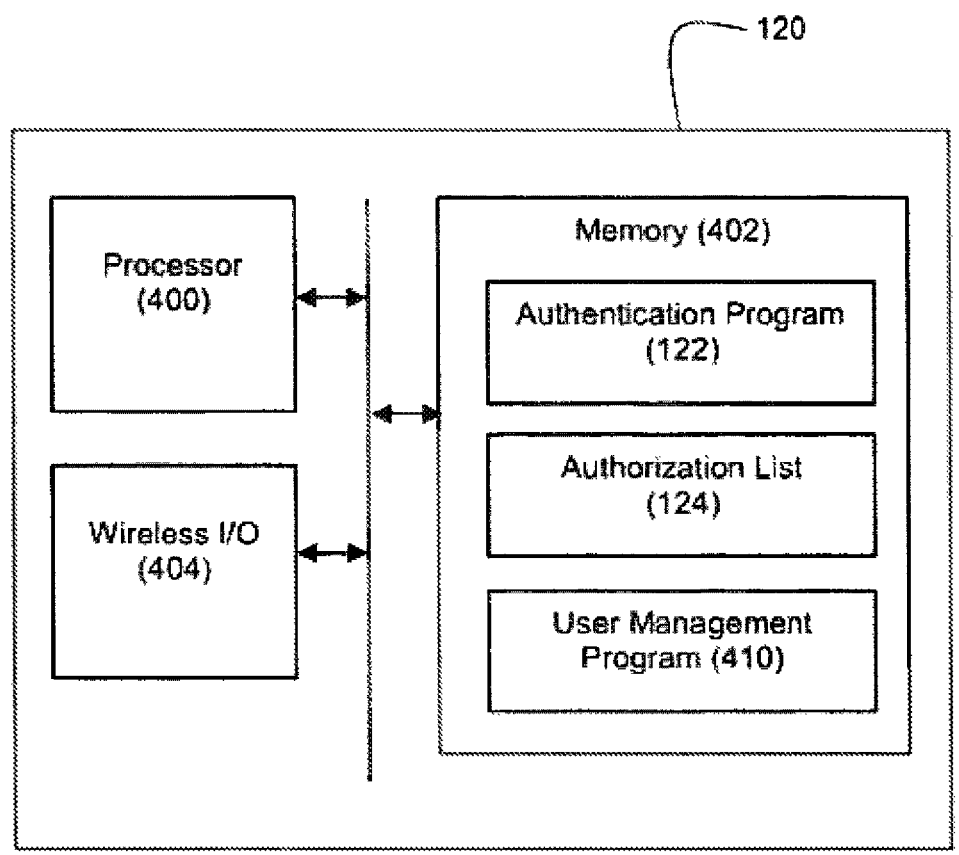
FIG. 4 shows an example embodiment of a computer system that provides an authentication service for security fobs.

FIG. 4 shows an example embodiment of computer system 120. The computer system 120 can serve as an authorization gateway that determines whether a given security fob 110 is authorized to control the security status of a product display assembly 100. As an example, the computer system 120 can take the form of a server that includes a processor 400, a memory 402, and wireless I/O 404. These components can also be configured to communicate with each other over a bus or similar interconnection. Such a server can optionally be configured as a Linux server that runs a Linux operating system.

The processor 400 and memory 402 can be any hardware devices suitable for performing the operations described herein. As an example, the processor 400 can take the form of an Atmel SAMD21 microprocessor. The memory 402 can be integral to processor 400 and/or external to the processor 400.

The memory 402 can store the authentication program 122 as well as the authorization list 124 used by the authentication program 122 when determining whether a security fob 110 is an authorized security fob. The authorization list 124 can take the form of a list of one or more fob identifiers 112 for security fobs 110 that are authorized to control the security status for the product display assembly 100. The memory 402 can also store a user management program 410 that controls how fob identifiers 112 are added to and removed from the authorization list 124. The software programs 122 and 410 can take the form of a plurality of processor-executable instructions that are resident on a non-transitory computer-readable storage medium such as memory 402. Example embodiments of software programs 122 and 410 are described below with reference to FIGS. 7, 9A, 9B, 14, and 17.

The wireless I/O 404 provides wireless connectivity with remote systems such as the security fobs 110. The wireless I/O 404 can be any wireless communication device suitable for performing the operations described herein. As an example, the wireless I/O 404 can take the form of an Atmel AT86RF212B RF transceiver, similar to that described for wireless I/O 206 of FIG. 2.

It should be understood that the computer system 120 can include components different than those shown by FIG. 4. For example, the computer system 120 can include its own interface for interfacing with interface 200 of the security fob 110 (e.g., in embodiments where interface 200 is a physical connector, the computer system's interface to the security fob can be a complementary physical connector for detachable connection interface 200). The computer system 120 could also include other input devices for interacting with software executed by the processor 400.

Figure 5:
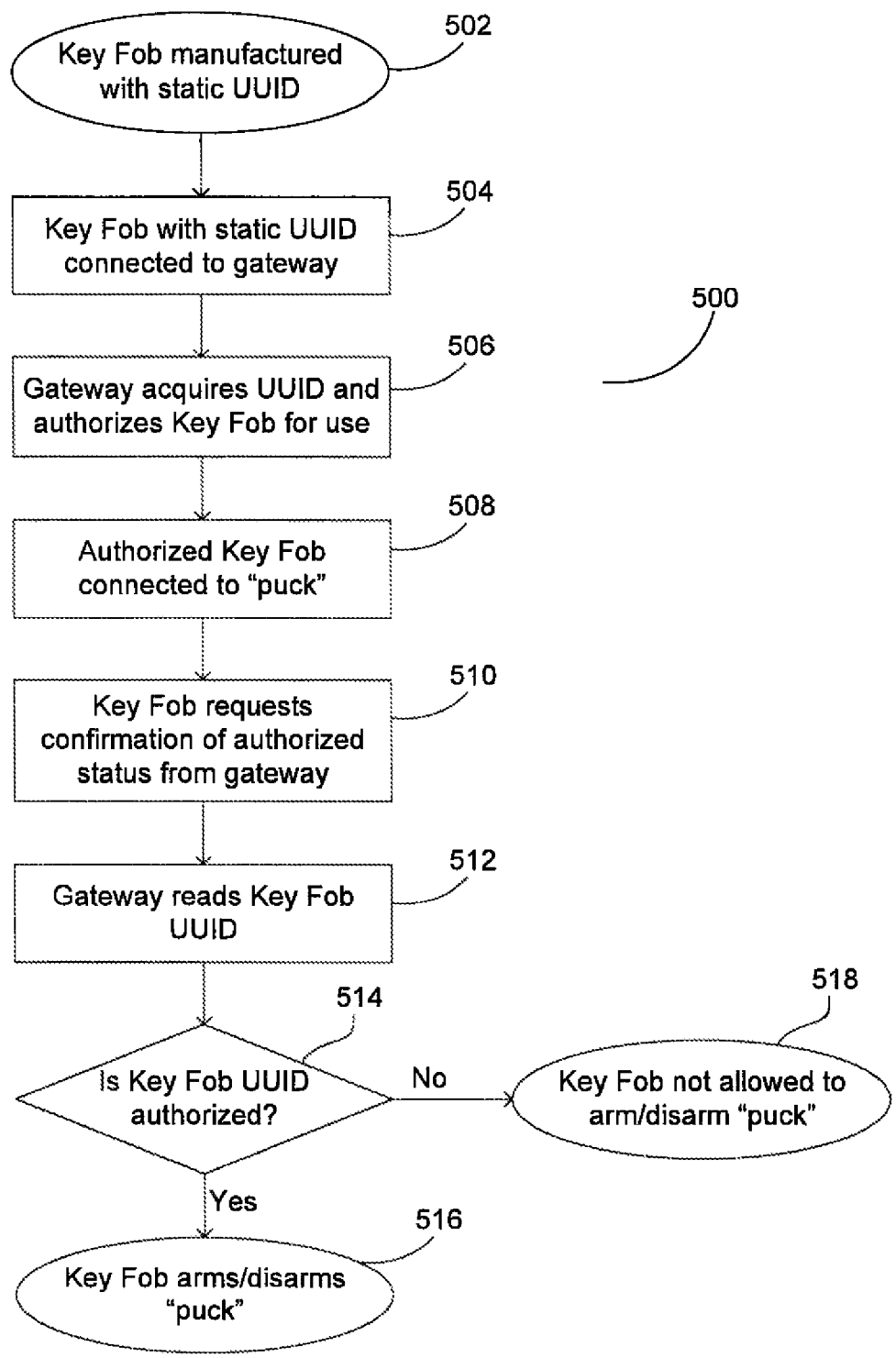
FIG. 5 depicts an example of a process flow for a system in accordance with an example embodiment.

FIG. 5 depicts an example of a process flow 500 for a system in accordance with an example embodiment. A user such as a store manager can receive a plurality of security fobs 110, each manufactured with a static UUID (step 502). At step 504, a user such as a store manager initially connects a security fob 110 to the computer system 120, at which time the computer system 120 acquires the security fob's UUID and adds the security fob's UUID to the authorization list 124 to establish that security fob as an authorized security fob (step 506). The addition of a fob identifier to the authorization list can be referred to as "whitelisting" the security fob 110 corresponding to that fob identifier. An example procedure and corresponding technology for performing steps 504 and 506 that rely on a timed sequence of interactions between security fobs and the compute system are described in U.S. provisional patent application Ser. No. 62/323,466, filed Apr. 15, 2016 and entitled "Security Alarm Key for Retail Security Display" and in U.S. patent application Ser. No. 15/488,370, filed this same day, entitled "Authorization Control for an Anti-Theft Security System", and published as U.S. Patent Application Publication 2017/0300721, the entire disclosures of each of which are incorporated herein by reference.

When a whitelisted or authorized security fob is connected to a puck assembly 302 (step 508), the connected security fob 110 requests authorization from the computer system 120 (step 510). This authorization request can include an identification of the connected security fob's UUID. The computer system 120 reads the fob UUID for the connected security fob (step 512) and checks the key fob's UUID against the authorization list 124 (step 514). If the subject fob UUID is on the authorization list 124, then the connected security fob is authorized to transmit the security code 116 and arm/disarm the puck assembly's security circuitry (step 516). If the subject fob UUID is not on the authorization list 124, then no authorization is given (step 518).

Figure 6:
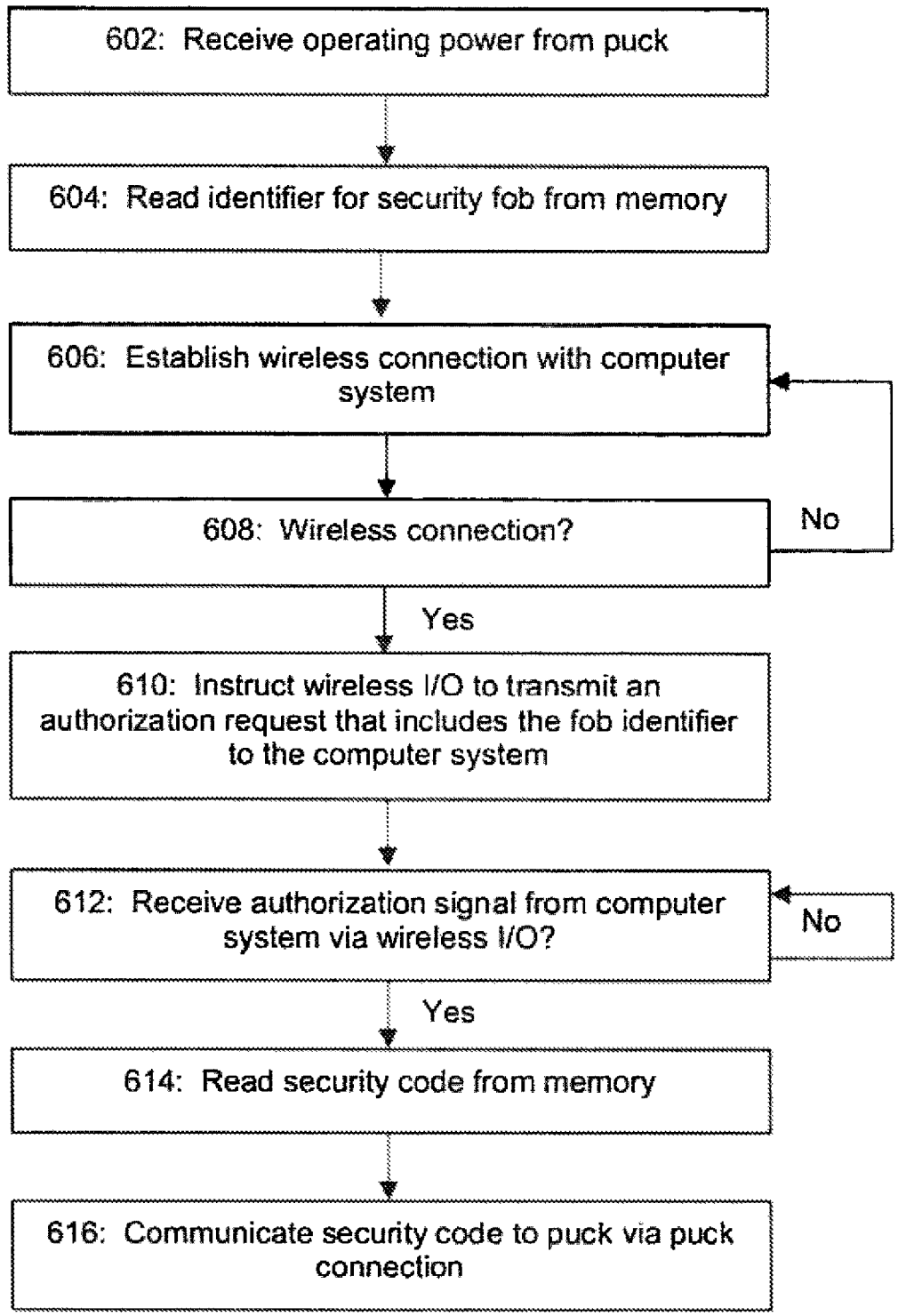
FIG. 6 depicts an example process flow for a software program for execution by the processor of a security fob to facilitate authorization.

FIG. 6 depicts an example process flow for software program 214 for execution by the processor 202 of security fob 110 to facilitate such an authorization arrangement. The process flow of FIG. 6 begins when the security fob 110 interfaces with a puck assembly 302 via interfaces 200 and 320. If there is a connection between interfaces 200 and 320, the security fob 110 can receive operating power from the puck assembly 302 via the connection (step 602). For example, in an example instance of a physical connection, the security fob 110 can draw current from the puck assembly 302 via the physical connection. Using such operating power, the processor 202 can wake up and execute software program 214. The security fob 110 can also be designed to have enough onboard capacitance to enable it to remained powered up during a sleep state for a desired amount of time (e.g., around 2 seconds).

After being powered up and starting execution of program 214, the processor reads the fob identifier 112 from memory 204 (step 604). At step 606, the processor attempts to establish a wireless connection with the computer system 120 via wireless I/O 206. If step 608 results in a conclusion that the wireless connection has not been established, the processor can return to step 606 to try again. As discussed below in connection with another embodiment, a practitioner may also employ additional procedures that would allow for use of the security fob 110 in certain situations where the wireless network may be unavailable. If step 608 results in a conclusion that the wireless connection has been established, the processor proceeds to step 610.

At step 610, the processor 202 instructs the wireless I/O 206 to transmit an authorization request to the computer system 120 via the wireless connection established at step 606. This authorization request will include the fob identifier 112 read at step 604. If desired, this authorization request can be encrypted by the processor 202 (e.g., AES encryption) to provide an additional layer of security (whereupon the encrypted authorization request would later be decrypted after receipt by the computer system 120). The processor 202 and wireless I/O 206 can packetize the authorization request for wireless transmission as a message to the computer system 120, and the wireless I/O 206 will wirelessly transmit this authorization request for reception by the computer system 120.

At step 612, the security fob 110 will await receipt of an authorization signal from the computer system 120 via the wireless connection in response to the authorization request sent at step 610. If the authorization signal from the computer system has been encrypted, step 612 may also include a corresponding decryption operation. The authorization signal can take the form of an authorization code that indicates to the processor 202 that the security fob 110 is approved as an authorized security fob. To facilitate this, the security fob can have the authorization code already stored in its memory 204. Then, upon receipt of the authorization signal, the processor 202 can compare the authorization code from the authorization signal with the authorization code stored in memory 204. If they are a match, the processor determines that the security fob is an authorized security fob (and the process flow proceeds to step 614). If there is not a match, the process flow can terminate or await another signal from the computer system.

At step 614, the processor 202 reads the security code 116 from memory 204. Then, at step 616, the processor 202 communicates this security code 116 to the puck assembly via the connection between the puck assembly and the security fob 110 (e.g., via the connection between interfaces 200 and 320). To further enhance the security of the system, the communication at step 616 can be an encrypted communication, and this encrypted communication employ a time-varying encryption. For example, the processor 202 can employ an encryption technique such as an encrypted I²C serial protocol for the communication between the security fob 110 and the puck assembly 302 at step 614. Further still, for a practitioner that may operate multiple stores, different encryption can be performed for different store locations (e.g., different encryption keys, different modes of encryption (e.g., electronic code book (ECB), cipher block chaining (CBC), etc.), and/or different types of encryption (e.g., AES, Triple DES, etc.).

Accordingly, it can be seen via FIG. 6 that the security fob 110 is designed to condition its release/communication of the security code 116 on a real-time, remote authorization check of that security fob 110.

It should be understood that FIG. 6 is merely an example of a process flow for execution in connection with software program 214, and a practitioner may employ alternate process flows. For example, the order of many of the steps in FIG. 6 can be changed (e.g., step 614 could be performed earlier in the process flow; step 604 could be performed between steps 606 and 610, etc.). As another example, additional steps could be employed (e.g., one or more additional steps of illuminating one or more lights 208 on the security fob 110 can be performed, such as after step 616 to notify a user that the security code 116 was sent to the puck assembly and/or after step 608 to notify a user that a wireless connection has been established, etc.).

Figure 7:
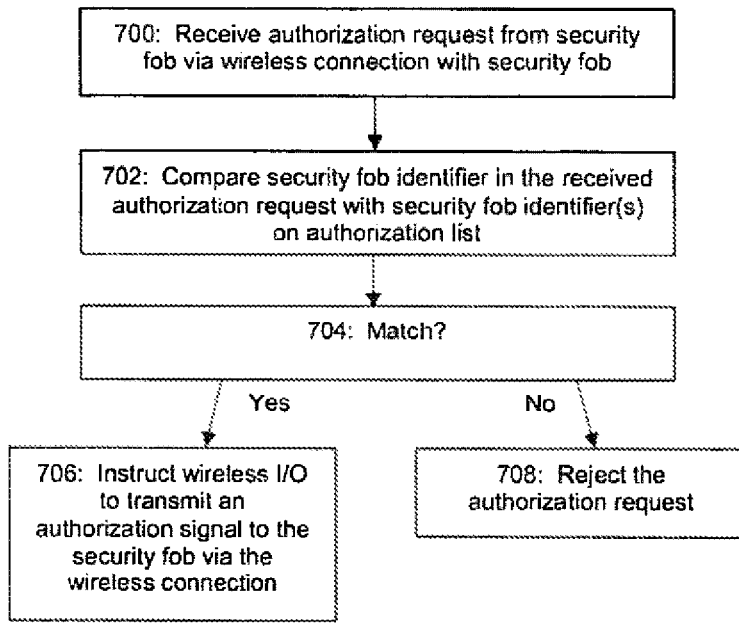
FIG. 7 depicts an example process flow for a software authentication program for execution by the processor of the computer system of FIG. 4.

FIG. 7 depicts an example process flow for software authentication program 122 for execution by the processor 400 of computer system 120. At step 700, the processor 400 receives the authorization request that was wirelessly transmitted by the security fob 110 via the wireless network at step 610 of FIG. 6. If the authorization request was encrypted by the security fob 110, step 700 can also include a corresponding decryption of the authorization request.

At step 702, the processor 400 checks whether the subject security fob 110 is an authorized security fob. To facilitate this check, the processor 400 can read the fob identifier 112 that is present within the received authorization request. The processor 400 can also read the authorization list 124 to identify the fob identifiers for authorized security fobs. The processor 400 can then compare the received fob identifier 112 with the fob identifiers from the authorization list 124 (step 704), and if the received fob identifier 112 matches any of the fob identifiers on the authorization list 124, the processor 400 can conclude that the subject security fob is authorized and proceed to step 706. If the received fob identifier 112 does not match any of the fob identifiers on the authorization list 124, the processor 400 can conclude that the subject security fob is un-authorized and proceed to step 708.

At step 706, the processor 400 instructs the wireless I/O 404 to transmit the authorization signal to the security fob 110 via the wireless connection established at step 606 of FIG. 6. This authorization signal can include the authorization code as discussed above in connection with FIG. 6. If desired, this authorization signal can be encrypted by the processor 400 (e.g., AES encryption) to provide an additional layer of security (whereupon the encrypted authorization signal would later be decrypted after receipt by the security fob 110). The processor 400 and wireless I/O 404 can packetize the authorization signal for wireless transmission as a message to the security fob 110, and the wireless I/O 404 will wirelessly transmit this authorization signal for reception by the security fob 110.

At step 708, the processor rejects the security fob's authorization request. If desired by a practitioner, this step may also include wirelessly communicating a rejection signal to the security fob 110. However, this need not be the case.

FIG. 8 depicts an example process flow for execution at least in part by a processor within security circuitry 104 to control security status for a product display assembly 100 in response to a security fob 110. The process flow of FIG. 8 can be embodied as a plurality of processor-executable instructions that are resident on a non-transitory computer-readable storage medium such as memory that is accessible to the subject processor.

At step 800, the security circuitry 104 detects a connection with the security fob at interface 320. This detection can be performed in any of a number of ways. For example, in an example embodiment where the connection between interfaces 200 and 320 is a physical connection, a configuration resistor in the security fob 110 can be detected by the security circuitry 104 to identify the connected device as a security fob 110. Different types of devices that may be connected via interface 320 can include different values for configuration resistors to thereby allow for the security circuitry 104 to distinguish between different types of connected devices. After detecting the connected security fob, the security circuitry 104 can provide operating power to the security fob 110 through the connection. At this point, at step 804, the security circuitry awaits receipt of a security code 116 from the connected security fob 110 (while the security fob 110 and computer system 120 proceed with their authorization routine).

If the security fob 110 is disconnected from the puck assembly 302 before the security code has been received from the security fob (step 812), the process flow terminates. In example embodiments where the connection is a physical connection, step 812 would detect a physical disconnection of the security fob 110 from the puck assembly 302 via techniques such as contact closure, power presence, communication lapse, etc. In example embodiments where the connection is a wireless connection, step 812 would detect a loss of wireless connection between the security fob 110 and puck assembly 302. But, if no disconnection is detected at step 812, the security circuitry 104 continues to await the security code from the security fob 110.

If a security code 116 is received from the connected security fob 110 at step 804, then the process flow can proceed to step 806. If the security code communication from the security fob 110 is encrypted, step 804 can include a corresponding decryption operation. At step 806, the security circuitry 104 compares the received security code with a security code known by the security circuitry 104 as the authorized security code (e.g., the security circuitry 104 can maintain the authorized security code in memory). If a match is found at step 808, the security circuitry 104 adjusts the security status based on the approved security code (step 810). If the security code is a toggle code, step 810 can result in a toggling of the security status of the security circuitry 104 (e.g., transitioning from an armed state to a disarmed state or vice versa). If a match is not found at step 808, the process flow terminates. Optionally, a rejection message can be sent to the security fob 110 via the security fob-to-puck assembly connection.

Figure 9A:
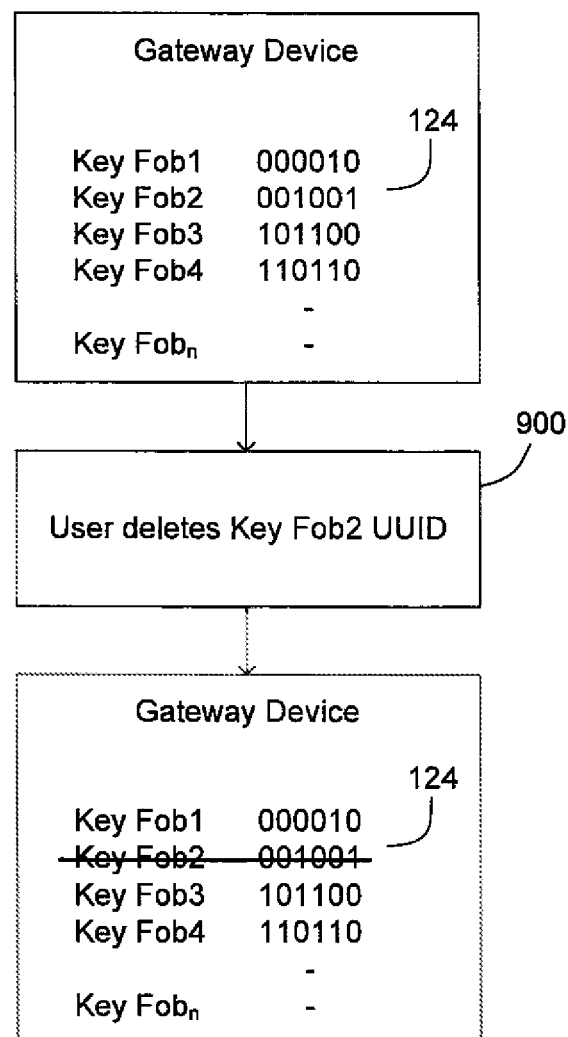
FIGS. 9A and 9B depict examples of how an authorization list maintained by the computer system can be managed.
Figure 9B:
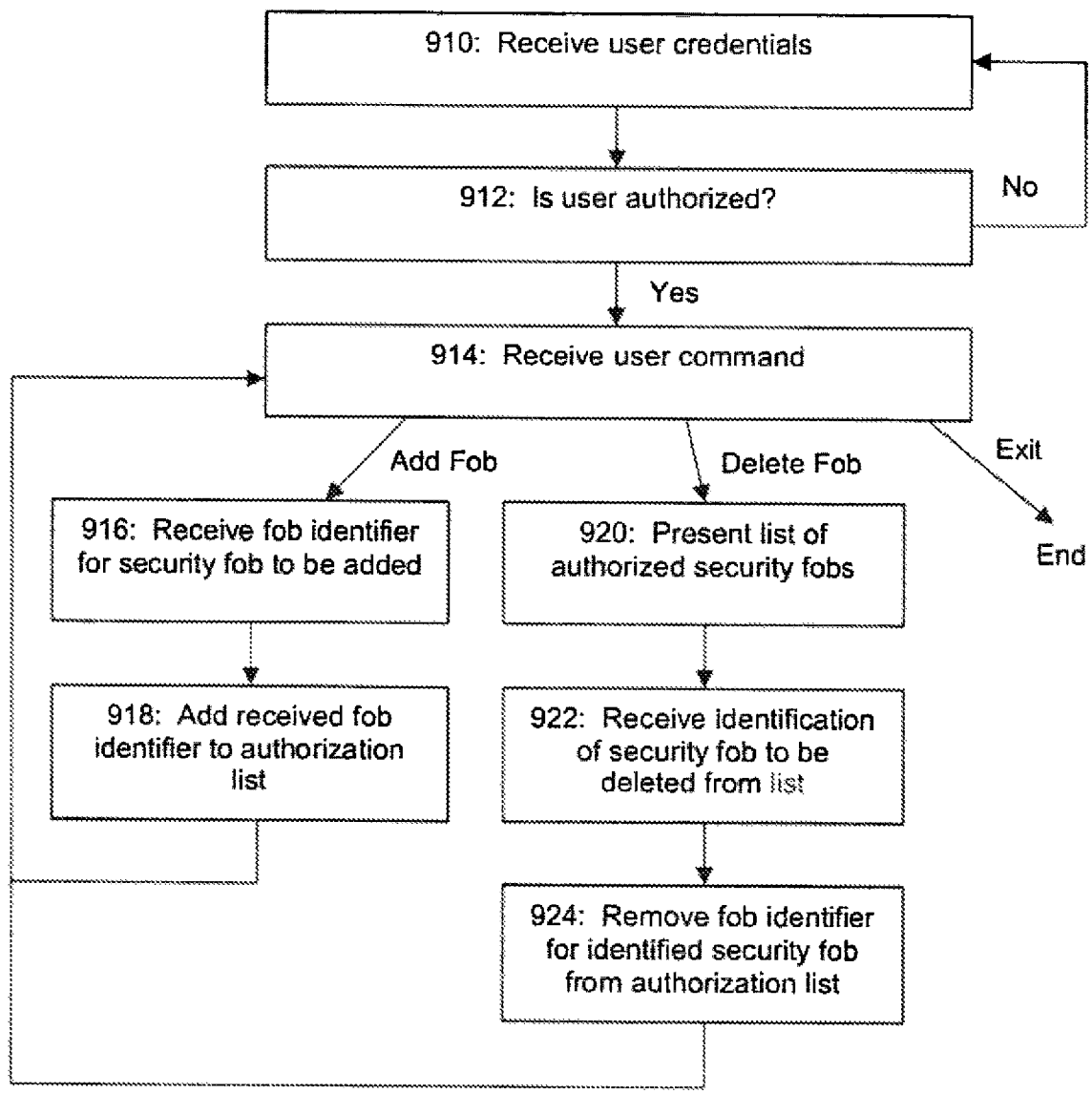

FIGS. 9A and 9B illustrate how the authorization list 124 can be managed to control which security fobs 110 are authorized (or de-authorized) with respect to controlling the security status of a product display assembly 100. FIG. 9A shows an example authorization list 124 that identifies the fob UIDs for a number of authorized security fobs. Through execution of a user management program 410, the computer system can add and/or remove a given security fob's fob UID to/from the authorization list 124. By way of example, FIG. 9A shows a step 900 where a user deletes Key Fob2's fob UID from the authorization list (where the updated authorization list 124 is shown below step 900). Once a security fob has been removed from the authorization list 124, the computer system's authentication program 122 will no longer authorize that security fob when it sends an authorization request.

FIG. 9B depicts an example process flow for the user management program 410 for execution by processor 400 of computer system 120. The process flow of FIG. 9B can be embodied as a plurality of processor-executable instructions that are resident on a non-transitory computer-readable storage medium such as memory 402.

At step 910, the processor 400 receives user credentials from a user (e.g., a user ID and password). At step 912, the processor checks these user credentials to determine whether the user is authorized to manage the authorization list. If yes, the process flow proceeds to step 914. At step 914, the processor awaits receipt of a command from the user through the software program. Examples of user commands that can be received include a user command corresponding to a request to add a security fob to the authorization list, a user command corresponding to a request to delete a security fob from the authorization list, and a command to exit the user management program 410.

Upon receipt of an "add fob" command at step 914, the processor performs an "add fob" operation with respect to the authorization list. At step 916, the processor receives a fob identifier 112 for a security fob to be added to the authorization list. This step can be performed in any of a number of ways. For example, the user could potentially manually enter the fob identifier 112 for the subject security fob 110. As another example, the computer system 120 and user management program 410 can include a reader function where the computer system includes an interface through which the reader reads the subject security fob's identifier 112. The user could then connect the subject security fob with this interface, whereupon the computer system reads the fob identifier 112 from the connected security fob.

Next, at step 918, the computer system adds the received fob identifier to the authorization list 124, thereby authorizing the subject security fob 110 for use in controlling the security status of the product display apparatus 100.

It should also be understood that the sequence of steps 910-918 could be replaced or complemented with the fob management techniques described in the above-referenced and incorporated U.S. provisional patent application Ser. No. 62/323,466, filed Apr. 15, 2016 and entitled "Security Alarm Key for Retail Security Display" and in U.S. patent application Ser. No. 15/488,370, filed this same day and entitled "Authorization Control for an Anti-Theft Security System", and published as U.S. Patent Application Publication 2017/0300721. With this approach, the authorized user can employ a manager fob that is first connected to the computer system's interface. The computer system would then validate this manager fob as an authorized manager fob. This would start a timer that defines a time window during which the user would need to connect the subject security fob 110 that is to be added to the authorization list to the computer system's interface. If the user connects the subject security fob to the computer system's interface within this time window, the fob identifier of the connected security fob is read and added to the authorization list 124.

Upon receipt of a "delete fob" command at step 914, the processor performs a "delete fob" operation with respect to the authorization list. At step 920, the computer system can present a list of the authorized security fobs to the user. This can involve a graphical display of at least the fob identifiers for the authorized security fobs (see FIG. 9A above step 900). However, it should be understood that the display could include additional information, such as the names of any particular users who are associated with each security fob (e.g., John Smith might be assigned with Security Fob 1 while Jane Doe might be assigned with Security Fob 2, etc.).

At step 922, the computer system receives an identification from the user of the security fob to be deleted from the authorization list. This identification can be provided via any suitable input technique such as point and click operations with a mouse, touch/tap operations via a touchpad, keyboard inputs, etc. Then, at step 924, the computer system removes the fob identifier corresponding to the security fob identified at step 922 from the authorization list 124.

Upon receipt of an "exit" command at step 914, the processor can end the user management program 410.

In scenarios where a manager wants to delete the entire authorization list, it should also be understood that the sequence of steps 910-914 and 920-924 could be replaced or complemented with the fob management techniques described in the above-referenced and incorporated U.S. provisional patent application Ser. No. 62/323,466, filed Apr. 15, 2016 and entitled "Security Alarm Key for Retail Security Display" and in U.S. patent application Ser. No. 15/488,370, filed this same day entitled "Authorization Control for an Anti-Theft Security System", and published as U.S. Patent Application Publication 2017/0300721. With this approach, authorization list deletion can be accomplished in response to the manager fob being connected to the computer system's interface in accordance with a defined sequence (e.g., connecting the manager fob, disconnecting the manager fob, and then re-connecting the manager fob during a defined time window without any intervening connections with one or more other security fobs).

Accordingly, it can be seen that the system described herein provides a flexible and easy-to-use manner for managing authorized security fobs that reduces any potential needs for reprogramming the security fobs themselves and/or re-programming the product display assemblies themselves as the persons employed at a retail store change over time. If a security fob is lost by an employee or kept by a departed employee, a manager only needs to update the authorization list 124 via the user management program 410 to maintain security. There is no need for all of the security fobs and/or all of the product display assemblies to be re-programmed with new security codes.

Moreover, as mentioned above, the system may employ an alternate security control technique via the security fobs that provides an ability to control security status during specific situations such as time periods where the wireless network is down such that security fob identifiers 112 cannot be communicated wirelessly to the computer system 120. To provide this flexibility, the security fobs 110 may be provided with a defined number of override tokens. An override token can be embodied in any of a number of ways within security fob memory 202 such as data bits that identify a count of how many override tokens are present on the security fob. A security fob 110 that includes an override token is effectively able to control the security status of the product display assembly regardless of whether the computer system authorizes that security fob. Thus, the override tokens are a way for the system to provide a security fob with a number of "free" security toggles that are not dependent on receiving authorization from the computer system 120.

As an example, a given security fob 110 may be provided with three (3) override tokens. A record of these override tokens can be maintained in memory 204. In this instance, if the security fob 110 cannot receive an authorization response from the computer system (e.g., a wireless connection cannot be established between the security fob 110 and the computer system 120), and if that security fob has at least one override token stored in its memory, then the security code 116 will be communicated to the puck anyway. When an override token is used in this manner, the security fob will decrement the number of override tokens stored by the subject security fob by "one." Accordingly, the override tokens can serve as a useful backup in times when the wireless network may be down or other technical problems arise because there may still be a need to arm/disarm product display assemblies during such times. Furthermore, user management program 410 can be used to manage how many override tokens are provided to the security fobs.

Figure 10:
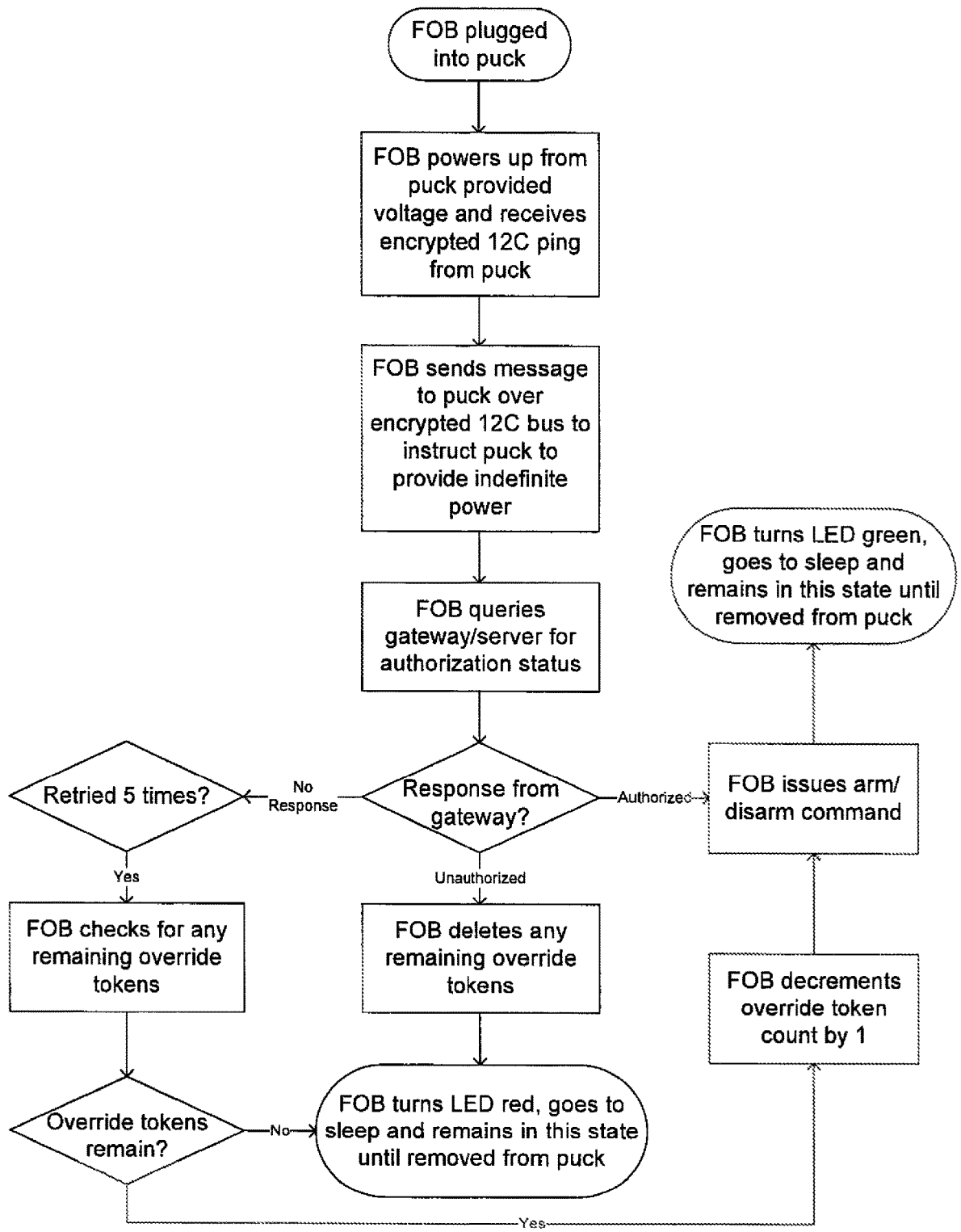
FIG. 10 depicts an example of a process flow for a system in accordance with another example embodiment.
Figure 11:
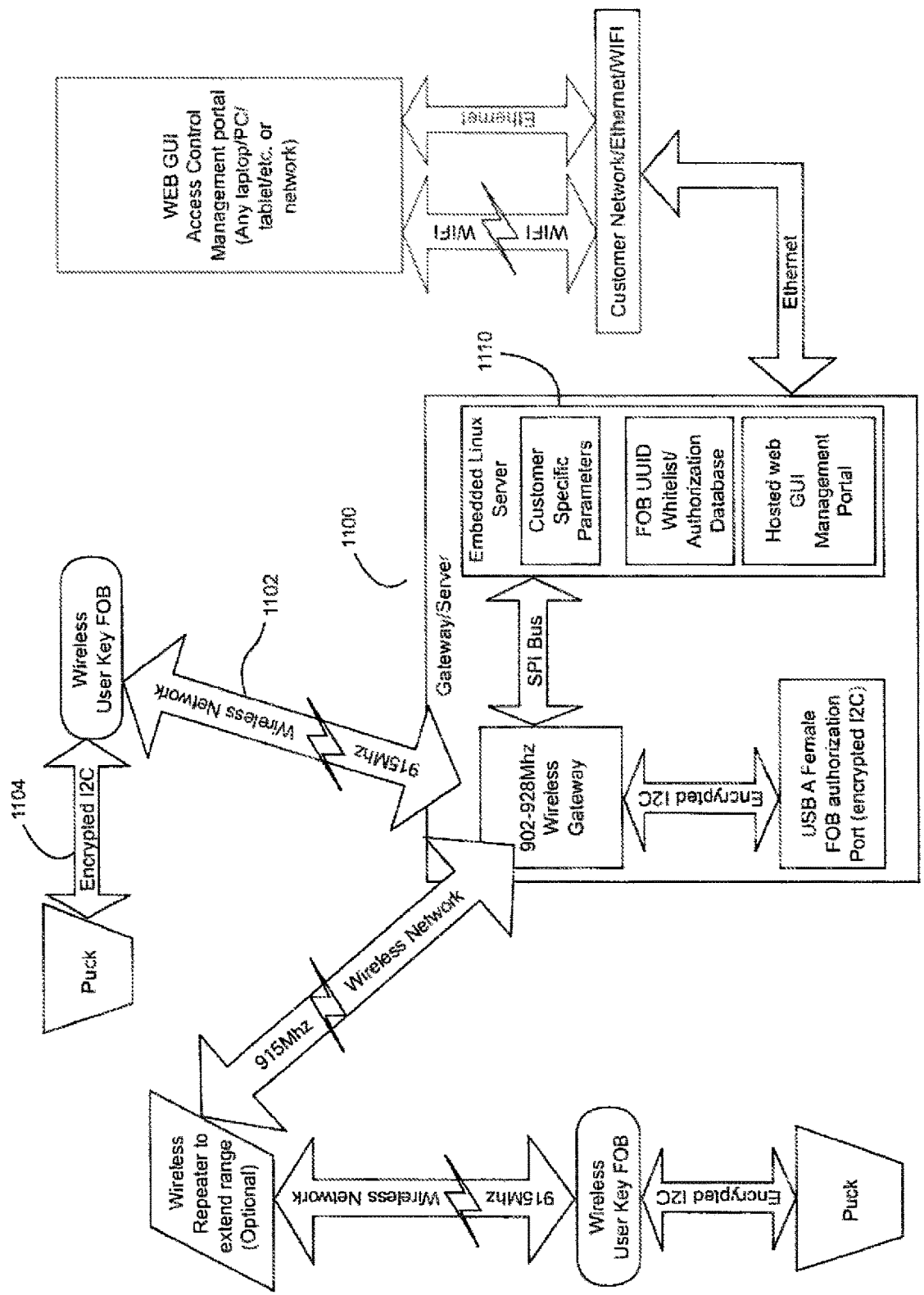
FIG. 11 depicts an example system diagram for carrying out the process flow of FIG. 10.

FIGS. 10 and 11 depict an example process flow and system diagram for a scenario where the security fobs can accommodate override tokens. Each security fob functions as a wireless node that can communicate to the computer system 120 (e.g., gateway device or a gateway/server indicated at 1100 in FIG. 11) when powered on. The security fob contains circuitry necessary to support two basic communication paths as discussed above and below.

The first communication path 1102 involves the security fob being a wireless node that can communicate with the gateway and server (linux server). The second communication path 1104 is an encrypted protocol (e.g., an I$^2$C serial protocol) between the security fob and product display assembly (e.g., puck assembly).

As indicated in the above general description, the security fob does not store any programmed or dynamic authorization security codes. Security implementation is always enforced via real-time communication/check-in with the gateway/server 1100. In other words, security is not managed by the key fob but by the gateway/server 1100. Due to the potentially sensitive communication that may happen over wireless links, all wireless communications are preferably AES encrypted. Also, due to the nature of wireless networks, an optional repeater wireless node may need to be part of the system.

The security fob can be a passive device that is powered by either the puck or the gateway/server, depending on which device the security fob is connected to. When so connected, the security fob will harvest enough power for all required security fob operations/authentication. The security fob can have a green and red LED which will be used to indicate to the user whether the security fob is an approved device, as well as signaling a successful arm/disarm action with the product display assembly. Also, the network parameters used for the wireless network communications can be transferred to the security fob when connected to the gateway/server and stored in non-volatile memory.

In this example, the security fob will have an override token setting that can transferred via command from a management portal for the computer system executing user management program 410, where this command can set the number of override tokens to any number from 0 to N (e.g., where N=100). The default setting of override tokens can be 0. The override token number correlates to the number of authorized uses available to the security fob in the event of wireless communication failures. When override tokens are used, the number will be decremented, for each use, until it reaches 0, in which case the security fob is rendered inactive unless authorized via authentication program 122. A method can be provided for renewing override tokens by plugging in the security fob to the gateway and issuing renewed override tokens via the gateway management portal.

A wireless repeater may be provided as an optional accessory that may or may not be required, depending on customer/installation specific parameters and variables. The repeater can be designed using an Atmel SAMD21 uProcessor for all computational functions, and it can use an Atmel AT86RF212B RF transceiver for wireless transmission.

As indicated in the FIG. 11 schematic, the gateway device 1100 may include an embedded Linux server system 1110 that has an on board Linux-compatible server that runs an ARM based processor. It will have adequate storage space for the operating system and applicable database. The functional specifications for the gateway device can be as follows:

Upon boot the gateway device will have 3 modes of simultaneous operation. These modes are (1) checking for a physical security fob connection; (2) checking status with the Linux server; and (3) listening for wireless communications.

For server communication mode the gateway device will communicate via SPI bus as the slave:
  Upon boot, the gateway device will have a null whitelist of security fob UUIDs. It will begin by pinging the Linux server periodically, over the SPI bus, requesting the latest whitelist until it gets a response.
  Once the gateway device has received a valid whitelist, the gateway device will relinquish communication requests to the Linux server.
  The gateway device will respond to all command/status requests from the Linux server.

For connected security fob/repeater communications, the gateway device will:
  Upon boot, the gateway device will periodically and continuously send an encrypted request message on the I$^2$C bus and check for a valid response.
  When a valid response is received, the response will identify the connected device as a security fob or repeater.
  If a repeater, the gateway device will transfer the current network parameters to the repeater.
  If a security fob, the gateway device will request the security fob's UUID, and then transfer the network parameters to the security fob. Optionally, the user will have the option to transfer/renew any desired override tokens.
    The gateway device will then alert the server to the presence of a connected security fob and transfer the security fob's UUID to the Linux server.
  The gateway device will then begin periodically checking for a connected device again.

For wireless communication:
  The gateway device will setup wireless communication upon boot.
  The gateway device will continually listen for any wireless communication requests from a security fob.
  When the gateway device receives an authentication request from a security fob, it will check the security fob's UUID, which was sent with the request, against the whitelist.
  If the security fob UUID is on the whitelist, the gateway device will send an authorized response back to the security fob.
  If the security fob UUID is NOT on the whitelist, the gateway will send an unauthorized response back to the security fob.

The Linux server system 1100 can support a SPI serial interface for gateway communications. The Linux server 1100 can host a small database that will be leveraged for an Access Control management portal. The database will store whitelisted security fob UUIDs as well as a log of all transactional authentication requests. Each whitelisted UUID can be stored with an optional "friendly name" parameter to make management for the end user easier.

The Linux server can also host a local web GUI that will be available via Ethernet or WiFi. The web GUI may be available directly by adding an optional monitor/keyboard/mouse if Ethernet/WiFi connectivity is not available. The web GUI can serve as the management portal interface for the end user to administer all Access Control management. The functional parameters of the Linux server can be as follows:

Upon boot the Linux server will load a locally hosted web GUI.
The Linux server will initialize the server's database of whitelisted key fob UUIDs and associated settings (friendly name and override token setting).
The Linux server will initialize the server's SPI interface to the gateway device.
Once all functions on the server are loaded and initialized, the Linux server will wait for commands from a user via management portal, a whitelist request from the gateway device or an alert from the gateway device that a security fob has been connected. During this wait state the Linux server will also ping the gateway device every 1 second, to ensure a functional SPI bus and reflect this online/offline status via indicator on the management GUI.
If the user changes the database of UUIDs the Linux server will transfer the new whitelist to the gateway device via the SPI bus.
The management portal web GUI will provide visibility to all currently whitelisted security fobs, a window for authentication logs and a window for displaying a currently connected security fob and its associated settings.

As described above, each security fob can be manufactured with a permanent UUID number. The security fob can have two modes depending on which hardware it has been plugged into (position vs gateway). When plugged into the gateway device, the security fob can operate as follows:
  The gateway device provides power to the key fob thereby allowing the key fob to power up.
  The gateway device initiates communications over the I$^2$C bus thereby allowing the security fob to determine if it is plugged into a position or gateway.
  The security fob transfers its UUID upon request of the gateway device.
  The gateway device transfers network parameters to the security fob.
  At user discretion, the gateway device transfers any override tokens to the security fob.
  The security fob blinks green LED after successful UUID and network parameter transfer. If there is an error in transferring UUID/network parameters then the security fob blinks red and requires removal and reinsertion.

When plugged into the gateway device, the security fob operates as follows: When plugged into a product display assembly (which can be referred to as a "position"), the security fob operates as follows:
  The position provides power pulse to the security fob allowing the security fob to power up.

The position sends an initial encrypted I²C message following application of power. This allows the security fob to know it has been plugged into the position.

The security fob sends an encrypted I²C acknowledgement message indicating that the security fob has been connected, which prompts the position to enable indefinite power application to the security fob.

The security fob initializes wireless circuitry and queries the gateway for Access Control status.

The security fob will either receive an authorized or unauthorized reply from the gateway device indicating if the security fob is approved/whitelisted or not.

The security fob will then store authorization status in volatile memory and go to sleep.

The position will remove persistent power once it detects the security fob has gone to sleep and initiate power pulsing mode.

Upon the next power pulse from the position, the security fob will wake up.

The position sends an encrypted I²C message shortly after sending the power pulse.

If the security fob is successfully authorized, it will reply to the encrypted I²C message with an arm/disarm toggle command. The security fob will then turn the green LED indicator and remain in this state until removed from the position. If the security fob was not successfully authorized, it will turn on the red LED and remain in this state until removed from the position.

In the event that wireless communications fail, the security fob will check the override token setting, and if the token setting is 0, the security fob will turn LED red and remain in this state without performing any action with position. If there are any number of override tokens greater than zero, the security fob will decrement the override token by 1 and issue an authorized arm/disarm command to the position. The security fob will then turn the green LED indicator on and remain in this state until removed from the position.

Figure 12:
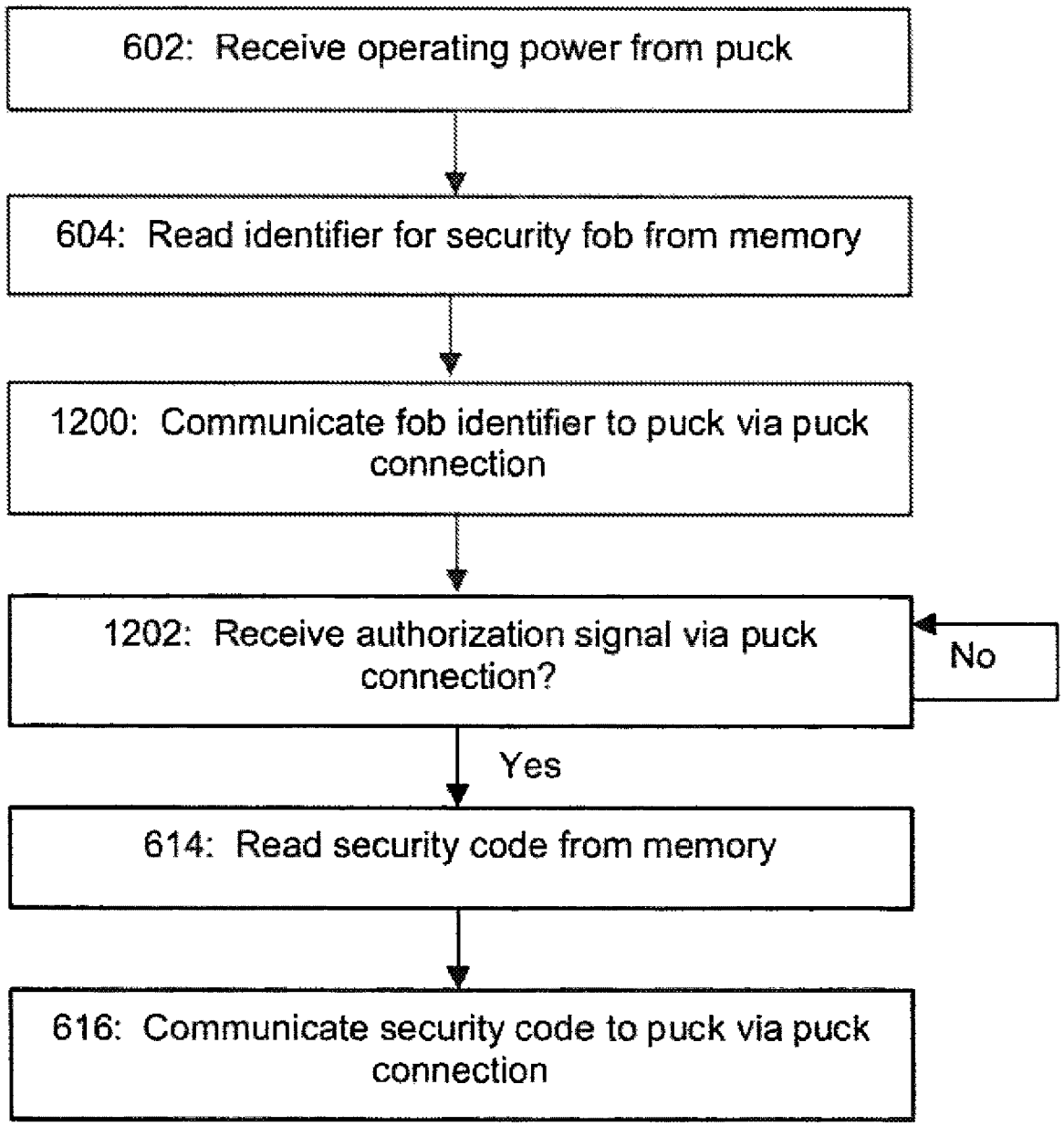
FIG. 12 depicts another example process flow for a software program for execution by the processor of a security fob to facilitate authorization.
Figure 13:
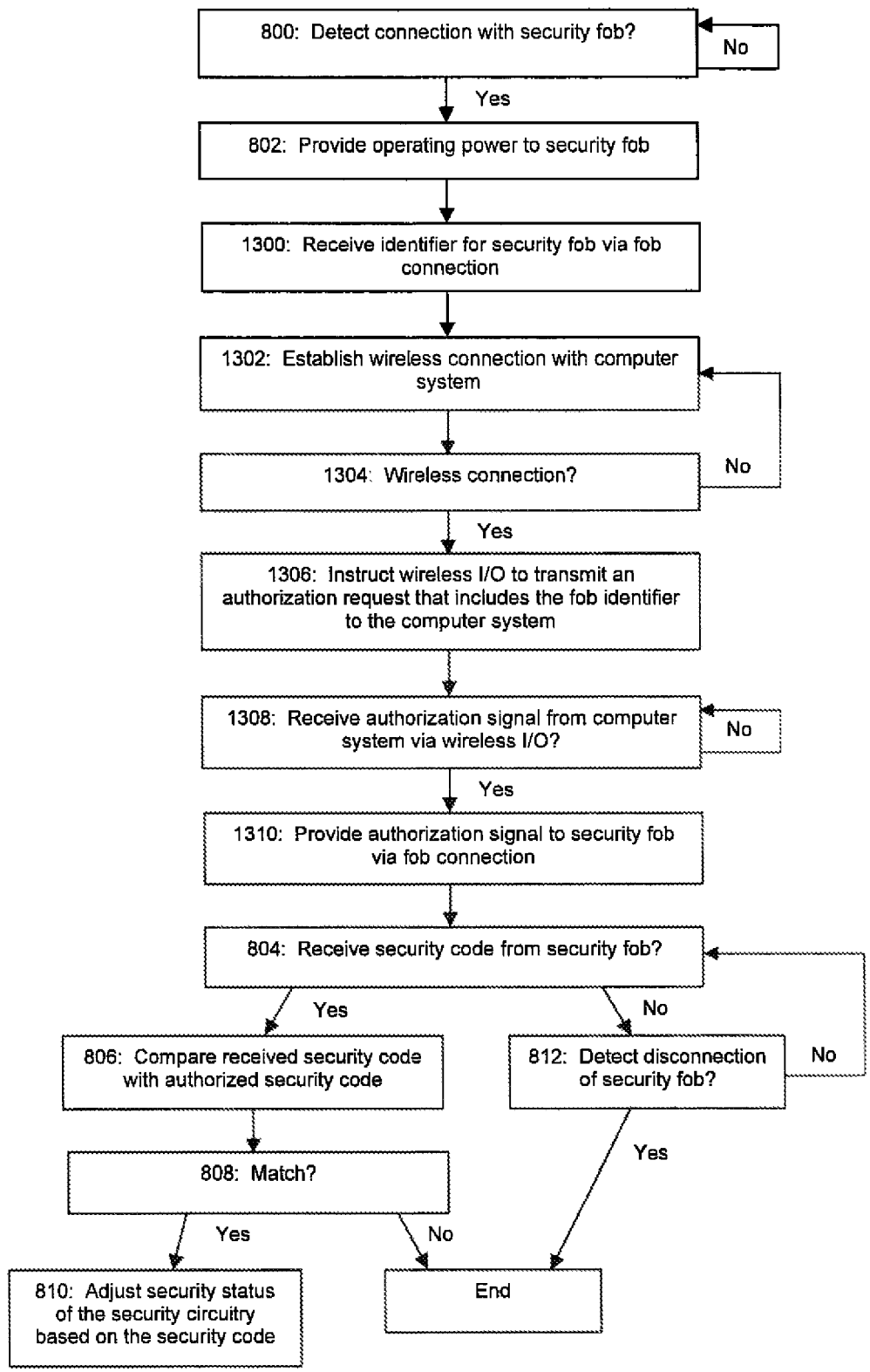
FIG. 13 depicts another example process flow for execution at least in part by a processor within security circuitry to control security status for a product display assembly in response to a security fob.
Figure 14:
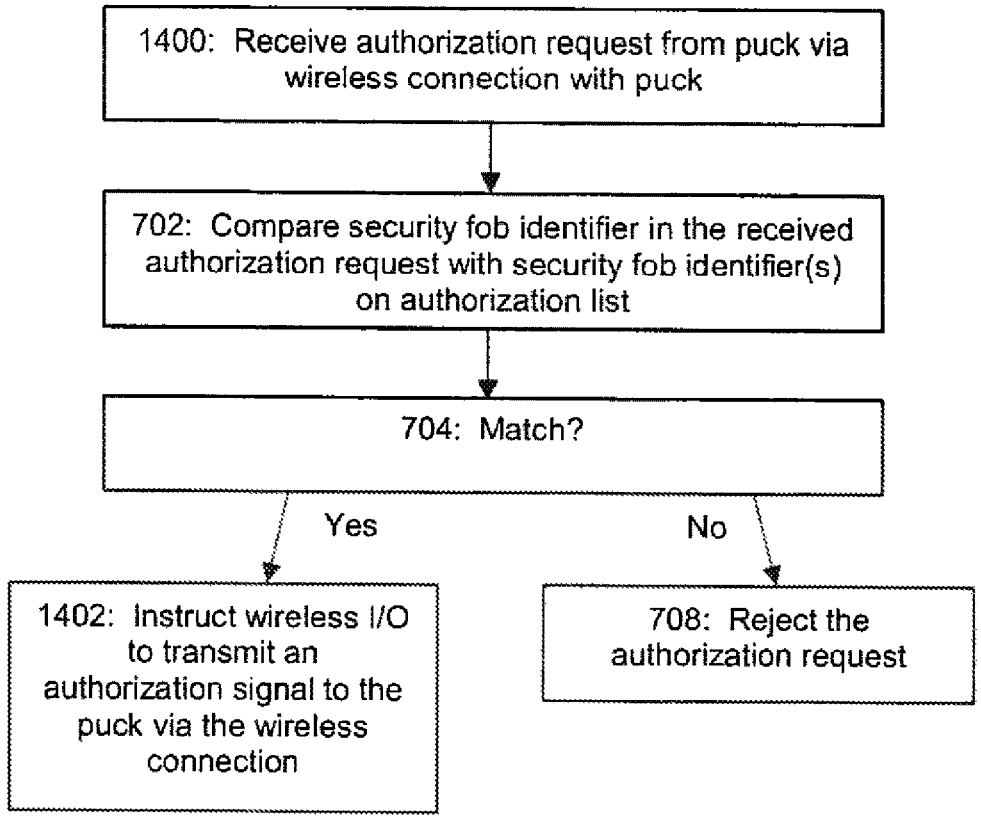
FIG. 14 depicts another example process flow for a software authentication program for execution by the processor of the computer system of FIG. 4.
Figure 15:
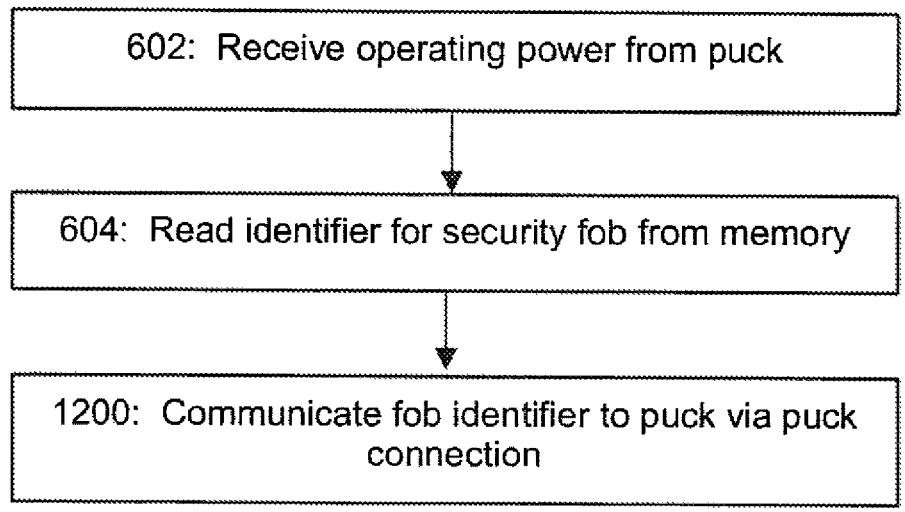
FIG. 15 depicts another example process flow for a software program for execution by the processor of a security fob to facilitate authorization.
Figure 16:
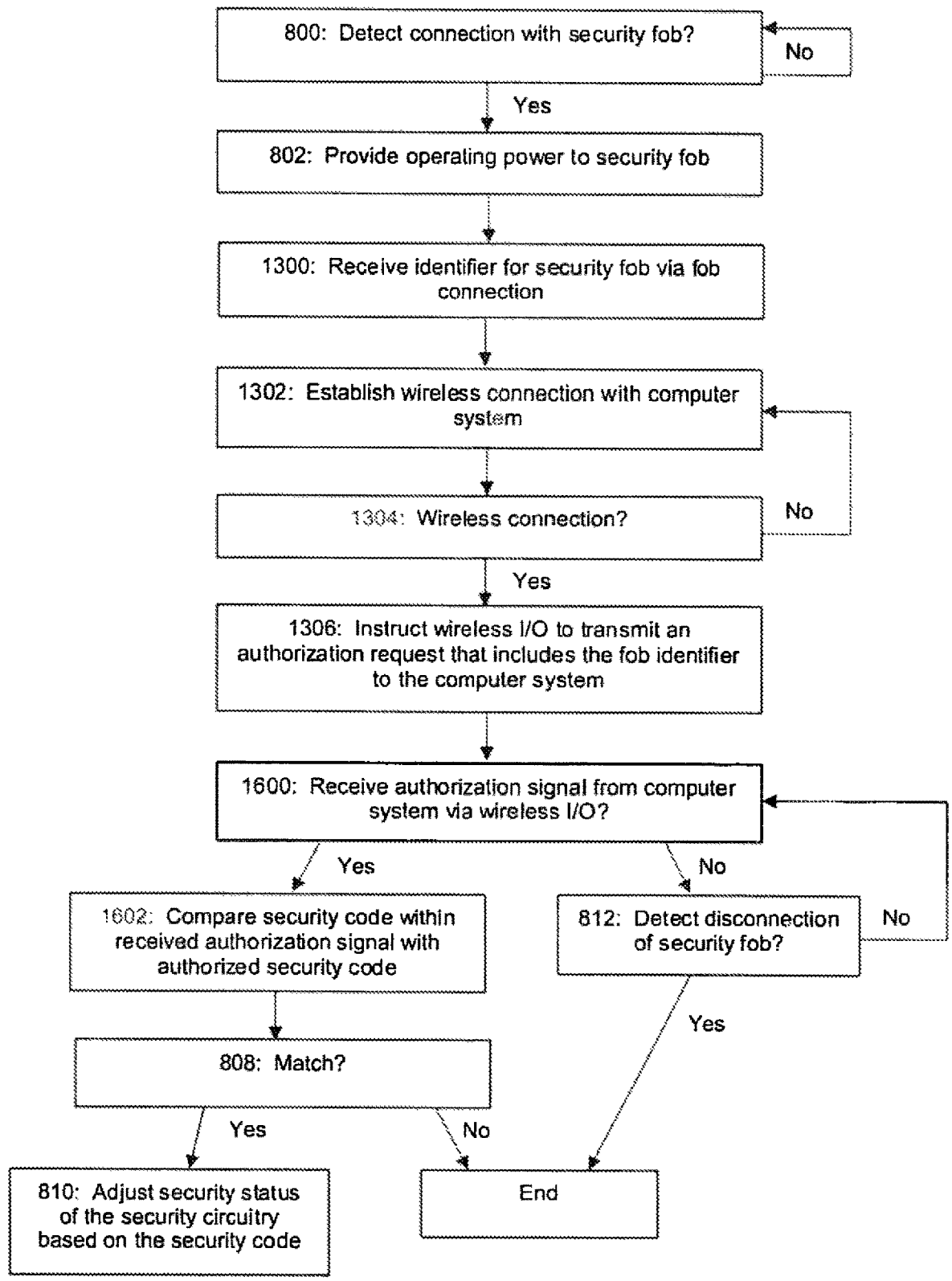
FIG. 16 depicts another example process flow for execution at least in part by a processor within security circuitry to control security status for a product display assembly in response to a security fob.
Figure 17:
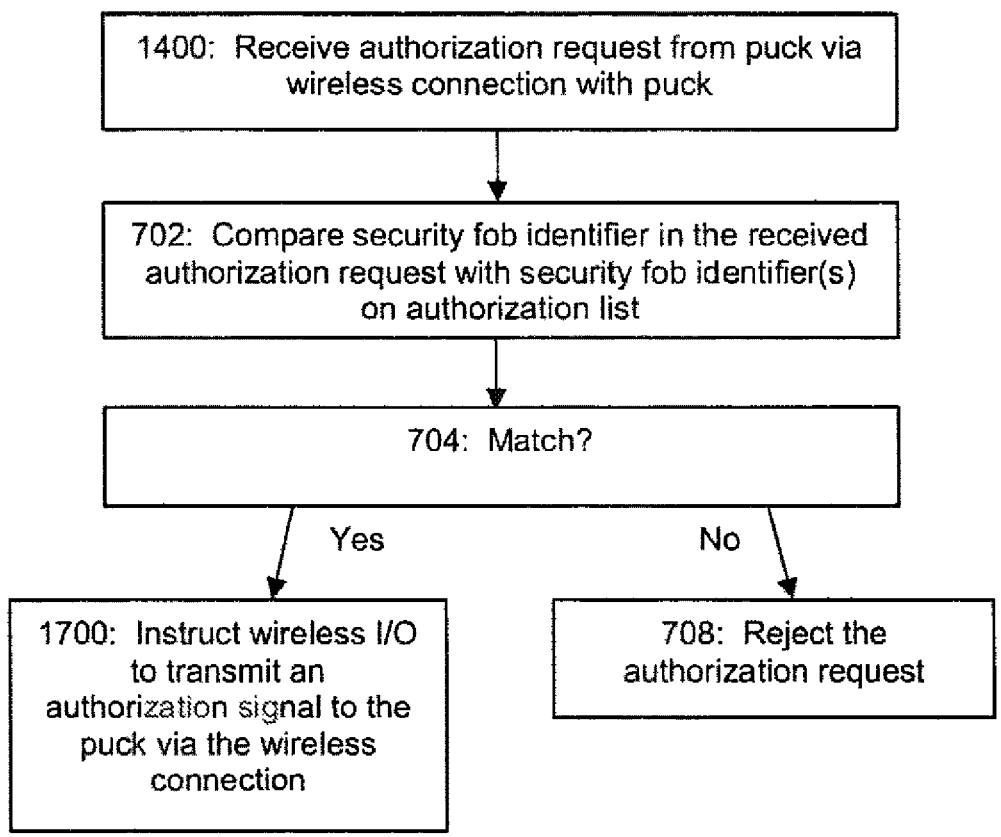
FIG. 17 depicts another example process flow for a software authentication program for execution by the processor of the computer system of FIG. 4.

Also, while the example embodiments described above rely on a wireless communication capability of the security fob 110 for achieving authentication via the computer system 120, it should be understood that other approaches could be used. For example, if the product display apparatus 100 includes its own wireless communication capability, then the need for security fob to maintain its own separate wireless communication capability could be eliminated if desired by a practitioner. Thus, if the product display assembly 100 includes its own wireless I/O that is capable of establishing a wireless connection with the computer system 120, then the security fob 110 can omit wireless I/O 206. With such a design, the communications between the security fob 110 and the computer system 120 can be routed through the product display assembly 100 to which the security fob 110 is connected. FIGS. 12-14 depict example process flows for an example of such an approach. FIGS. 15-17 depict example process flows for another example of such an approach.

FIG. 12 depicts an example process flow for software program 214 where steps 606-612 from FIG. 6 are replaced with steps 1200 and 1202. Rather than having the security fob 110 establish a wireless connection with the computer system 120, the security fob 110 can communicate its fob identifier 112 to the product display assembly 100 to which it is connected (step 1200). Also, rather than receive the authorization signal from the computer system 120 via a wireless connection, the security fob 110 can receive the authorization signal indirectly from the computer system 120 via the product display assembly 100 to which it is connected (step 1202).

FIG. 13 depicts a corresponding process flow for the security circuitry 104 that is similar in nature to FIG. 8, but layers in additional operations relating to establishing a wireless connection with the computer system 120 and relaying messages between the computer system 120 and connected security fob 110. At step 1300, the security circuitry 104 receives the fob identifier 112 that was communicated to it as a result of step 1200 from FIG. 12. The security circuitry 104 also establishes/checks the wireless connection with the computer system 120 at steps 1302 and 1304 and instructs its wireless I/O to wirelessly transmit the authorization request to the computer system 120 at step 1306. These steps are similar in nature to steps 606-610 from FIG. 6 but performed by the security circuitry 104 rather than security fob 110. At steps 1308 and 1310, the security circuitry receives the authorization signal from the computer system 120 and relays it to the connected security fob 110. Accordingly, it can be seen that the product display assembly 100 can serve as a conduit for communications between the security fob 110 and the computer system 120.

FIG. 14 depicts a corresponding process flow for authentication program 122 that is similar in nature to FIG. 7, but replaces the communications with the security fob from FIG. 7 (see steps 700 and 706 from FIG. 7) with communications with the product display assembly 100 (see steps 1400 and 1402).

Figure 18:
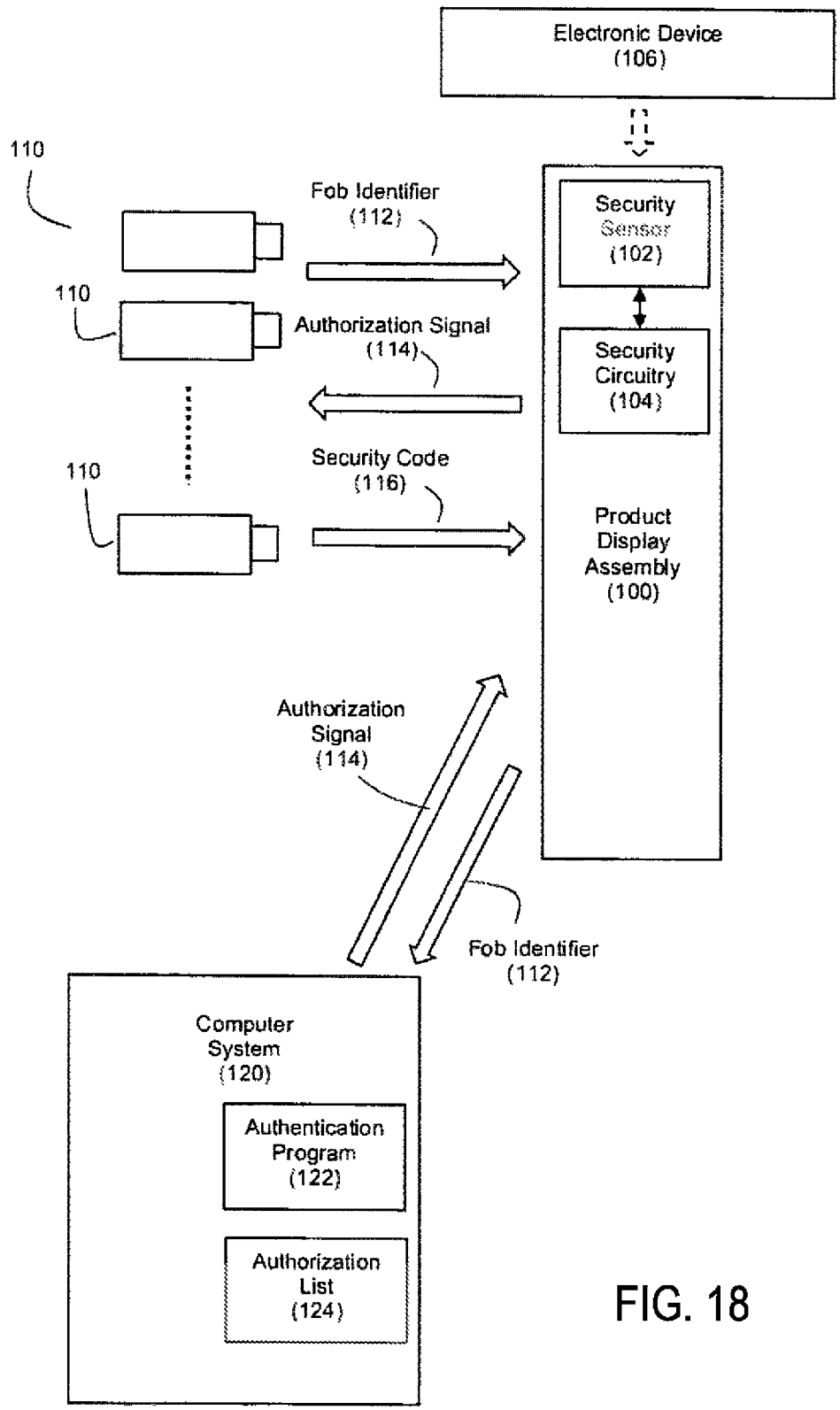
FIG. 18 discloses an example embodiment of a gateway-based authorization system for security fobs that can use the process flows of FIGS. 12-14.
Figure 19:
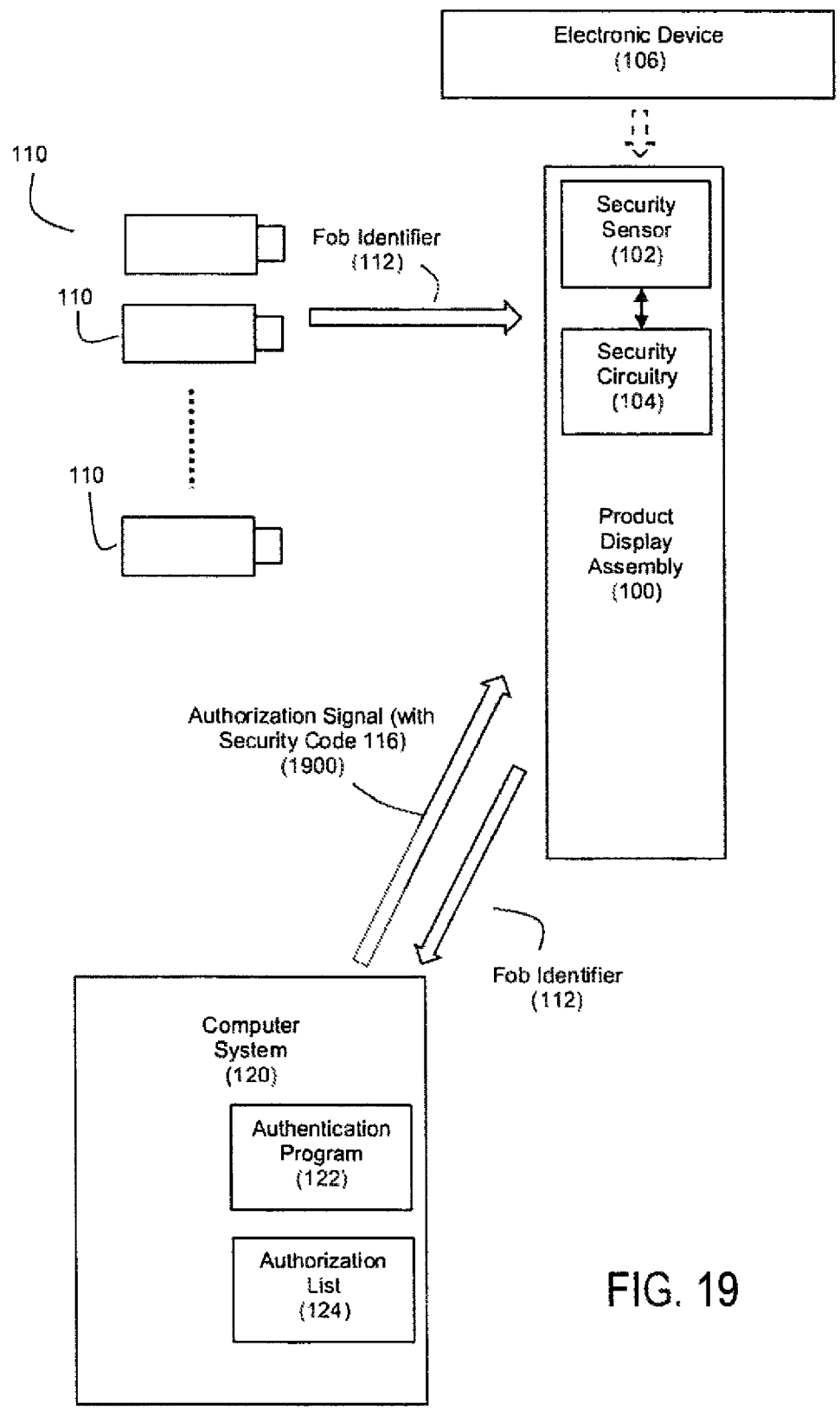
FIG. 19 discloses an example embodiment of a gateway-based authorization system for security fobs that can use the process flows of FIGS. 15-17.

Thus, with the approach of FIGS. 12-14, the security fob 110 is able to leverage the wireless communication capabilities of the product display assembly to support its operations, such that security code 116 is not output from the security fob 110 until the authorization signal is received from the computer system 120 (indirectly, via the product display assembly). An example system in accordance with the approach of FIGS. 12-14 is shown by FIG. 18. The approach of FIGS. 15-17 is similar to that of FIGS. 12-14 but avoids the need for the security fob 110 to maintain or output the security code 116. With the approach of FIGS. 15-17, the security fob 110 leverages the wireless communication capabilities of the product display assembly and the authorization signal from the computer system itself contains the security code, which means the return loop through the security fob can be omitted. An example system in accordance with FIGS. 15-17 is shown by FIG. 19.

FIG. 15 depicts an example process flow for the security fob 110 that is similar in nature to that of FIG. 12 but omits steps 1202, 614, and 616 from FIG. 12. As an example, a security fob 110 that can be used to implement the FIG. 15 process flow can be a simple badge or card with an RFID chip. The RFID chip can be energized when in proximity to an RFID reader that emits a field over a short range, and energization of the RFID chip can cause the chip to emit its identifier. FIG. 16 depicts an example process flow for the security circuitry 104 that is similar in nature to FIG. 13 but where the authorization signal received from the computer system 120 (see step 1600) includes the security code 116 (see authorization signal 1900 in FIG. 19). Accordingly, the need for the extra communication steps where the product display assembly passes the authorization signal to the security fob and the security fob returns the security code can be replaced with a more direct path where the authorization signal from the computer system 120 itself includes the security code 116. Thus, at step 1602 shown by FIG. 16, the processor within the security circuitry 104 compares the security code 116 within the received authorization signal with the authorized security code to support a determination as to whether a match exists. FIG. 17 depicts a corresponding process flow for authentication program 122 that is similar in nature to FIG. 14, but where the authorization signal will include the security code 116 (see step 1700).

Figure 20:
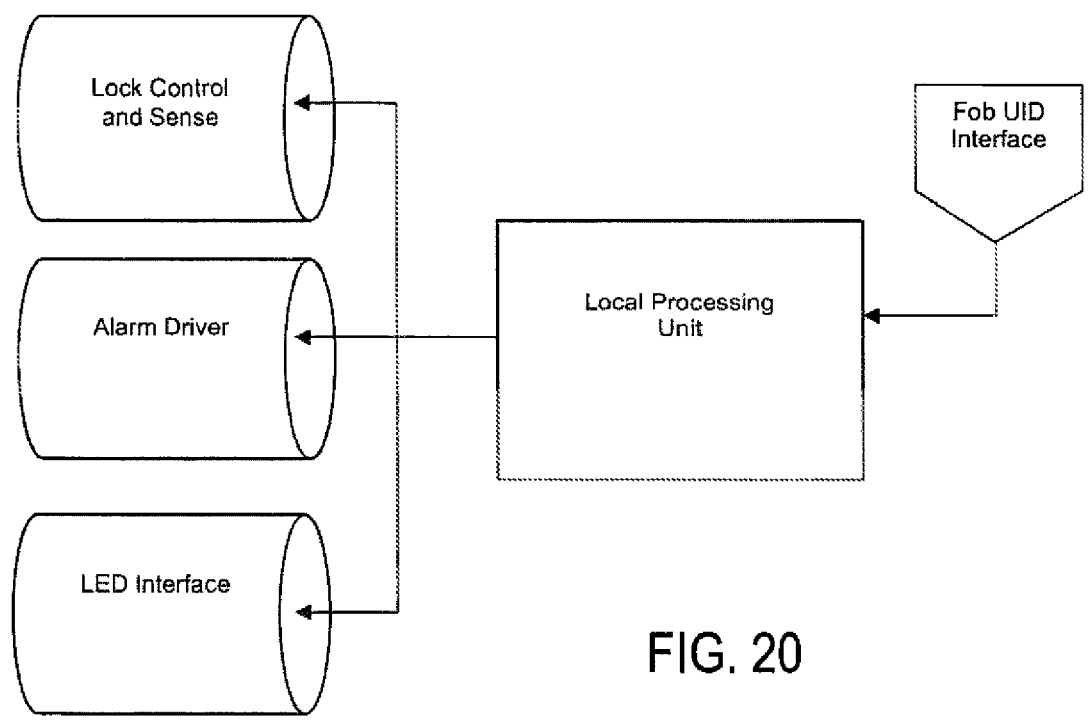
FIGS. 20-25 disclose example embodiments of security and related circuitry.
Figure 21:
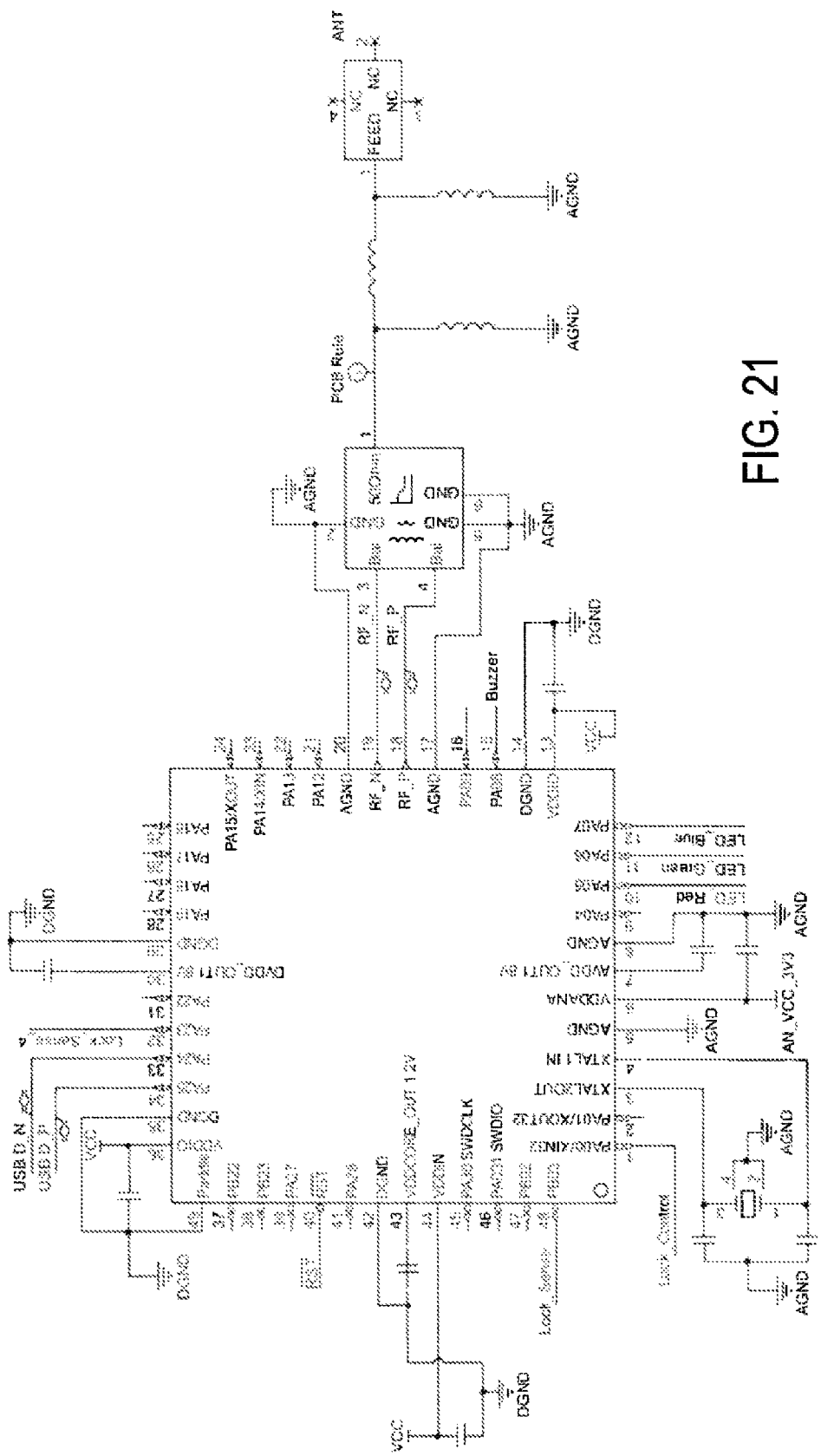
Figure 22:
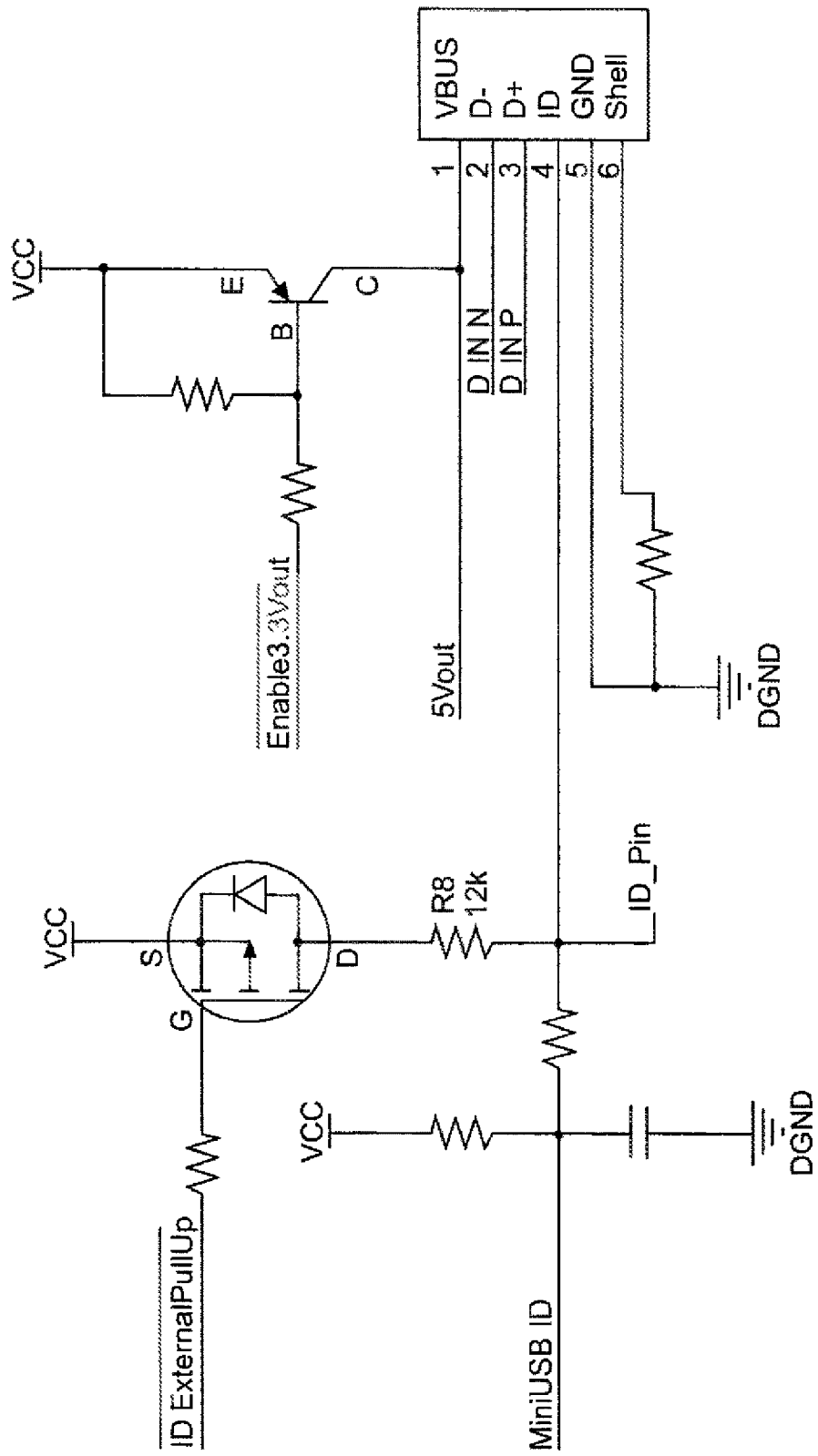
Figure 23:
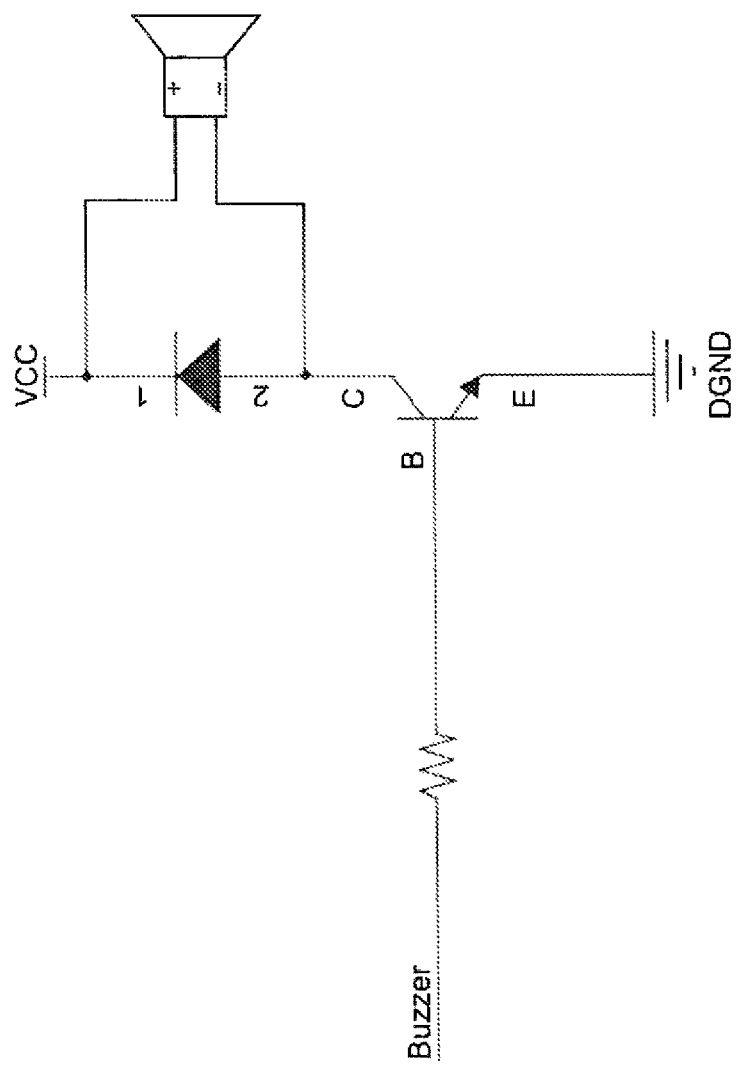
Figure 24:
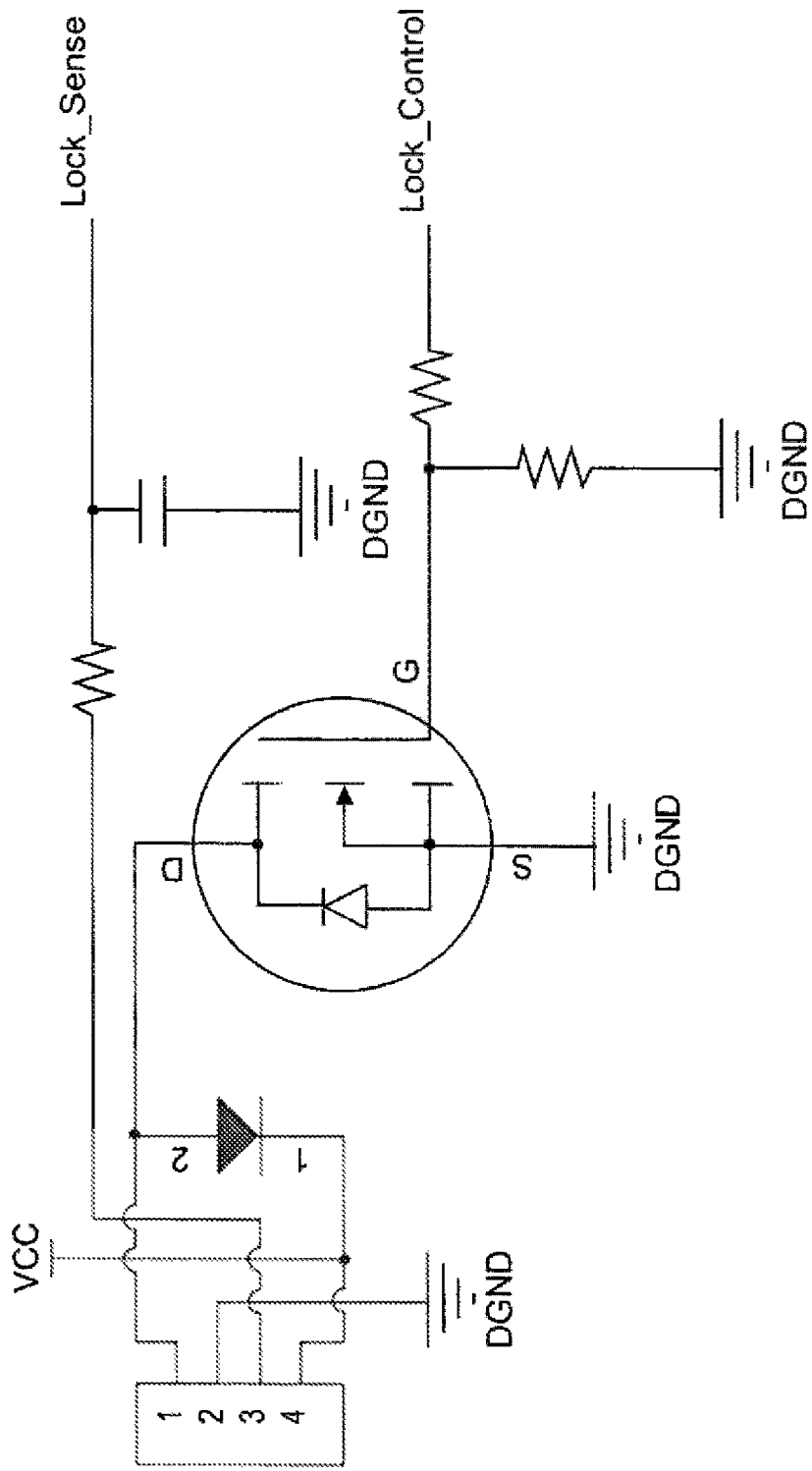
Figure 25:
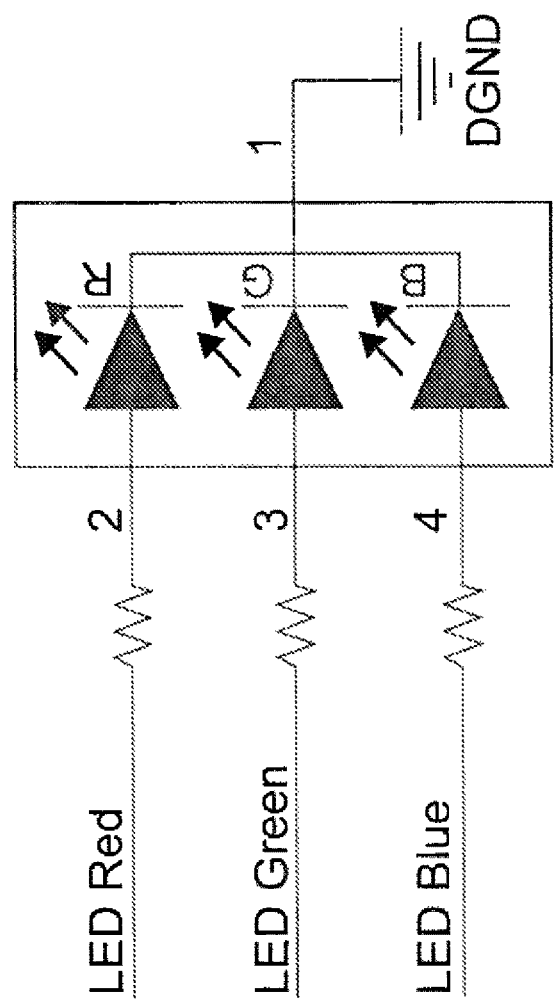

Examples of security circuitry 104 are shown by FIGS. 20-21 and 23-25. FIG. 20 shows an overview of the security circuitry 104. FIG. 21 shows a local processing unit that can be included with the security circuitry 104, where the local processing unit can be programmed receive a fob identifier 112 (via the interface shown by FIG. 22), wirelessly communicate the fob identifier 112 to the computer system 120, and then receive and process an authorization signal 1900 from the computer system 120 that includes security code 116. Upon verification of the authorization signal 1900 and security code 116, the local processing unit can control various security functions such as an alarm driver (see FIG. 23), a lock controller/sensor (see FIG. 24), and/or an LED interface (see FIG. 25). This arrangement would be consistent with the embodiment of FIGS. 15-17 and 19. It should be understood that part of the functions provided by the local processing unit of FIG. 21 could be deployed in the security fob 110 in the embodiment of FIG. 1.

Still other variations relative to the foregoing example embodiments can be employed by practitioners. For example, while the example embodiments discussed above describe the procedures attendant to the process flows of FIGS. 8, 13, and 16 being performed by the puck assembly 302 in response to the security fob 110 being connected to an interface 320 resident on the puck assembly 302, it should be understood that other variations can be employed. For example, a processor or corresponding circuitry can be deployed in the base assembly 304 to perform the process flows of FIGS. 8, 13 and/or 16. Also, the interface 320 can be resident in the base assembly 304 rather than the puck assembly 302 if desired by a practitioner. To the extent there would be a need to communicate security status to components in the puck assembly 302, such communications could be achieved via the connection between the puck assembly 302 and the base assembly 304 when the puck assembly 302 is at rest, or they could be achieved via wireless communication between the puck assembly 302 and base assembly 304. Further still, if the product display assembly 100 is designed as a one-piece unit such that there are not separate puck and base assemblies, it should be understood that the security circuitry 104 can be resident in any suitable location of the product display assembly 100.

As another example of an alternate embodiment, the security code 116 need not be pre-stored by the security fobs 110. Instead, the authorization signal 114 could be the mechanism by which the security code 116 is provided to the authorized security fobs 110 for forwarding to the product display assembly 100.

In yet another alternate embodiment, the security circuitry 104 can be configured to store a cache of whitelisted/authenticated fob identifiers 112 in its memory. This cached memory can then be leveraged to perform authentications locally within the security circuitry 104 itself, thereby avoiding a need to establish a wireless connection with the computer system 120 each time that a connection is made with a security fob. With such a design, the security fob 110 can provide its fob identifier 112 to the security circuitry after connection is established between interfaces 200 and 320. If the authentication cannot be made based by the security circuit 104 based on the cache, then the process flow would proceed through the computer system 120 as described herein. A practitioner could program the security circuitry 104 to purge the cache of authorized fob identifiers according to a desired protocol (e.g., nightly, weekly, each time an employee departs, etc.).

In yet another alternate embodiment, the computer system 120 can be configured to push copies of the authorization list 124 down to the local memories in the product display assemblies 100 in order to obviate the need for an on-line wireless connection between security fobs 110 and the computer system 120. Copies of the authorization list 124 can be transferred from the computer system 120 to the product display assemblies 100 via a wireless connection between the two (e.g., a wireless network). Alternatively, the transfer can be performed using a memory device or the like (e.g., a security fob used by a store manager where the fob includes memory that stores the authorization list 124), where the memory device is physically connected to the product display assembly 100 (e.g., via interface 320) so that the authorization list 124 can be loaded into the local memory of the product display assembly 100. With such an arrangement, the authentication program 122 could also be stored in the local memory for execution locally at the product display assembly 100.

Also, as indicated above, the security fobs 110 can take any of a number of forms, including embodiments where the security fobs 110 are mobile computing devices such as smart phones or tablet computers. With such an approach, the system is able to leverage the native wireless networking capabilities of the smart phones and tablet computers to connect with the product display assemblies 100 (e.g., using techniques such as Bluetooth, Near Field Communication (NFC), or short-range Wi-Fi) and with computer system 120 (e.g., using techniques such as Bluetooth, Near Field Communication (NFC), short-range Wi-Fi, or even using longer range wireless networking techniques). A mobile app could be loaded on the smart phone or tablet computer to provide the smart phone or tablet computer with the functionality described herein for connecting to other components in the system and sending security commands to desired product display assemblies.

Further still, with respect to any of the foregoing embodiments, alternate anti-theft security systems can be used in place of or in conjunction with the product display assembly 100. For example, the anti-theft security systems can include cabinets, boxes, bins, and/or containers that are protected from open access via locks and the like. As an example, the security circuitry 104 discussed herein could be incorporated in such cabinets, boxes, bins, and/or containers (e.g., deployed within the locks that regulate access to the cabinets, boxes, bins, and/or containers).

While the invention has been described above in relation to its example embodiments, various modifications may be made thereto that still fall within the invention's scope. Such modifications to the invention will be recognizable upon review of the teachings herein.

What is claimed is:

1. A system comprising:
   two or more security fobs, each security fob stores an associated unique fob identifier and a same security code shared by the two or more security fobs, communicates the fob identifier and upon receipt of a corresponding authorization signal transmits the security code;
   a product display assembly having a security status that is controllable via an interaction with the two or more security fobs, the product display comprising:
   a puck assembly adapted to receive a product for presentation to a customer, a base assembly adapted to support the puck assembly, and security circuitry that switches security status of the display assembly between an armed state and unarmed state upon receipt of the security code; and a computer system remote from the product display assembly, the computer system stores an authentication list of one or more authorized security fobs and, based on receipt of the fob identifier that is associated with one of the two or more security fobs, compares the fob identifier to fob identifiers of the authentication list to determine whether the security fob is an authorized security fob, and in response to a determination that the security fob is an authorized security fob, transmits an authorization signal that authorizes the security fob to transmit the security code, wherein the puck assembly is moveable between (i) a rest position in which the puck assembly rests on the base assembly and (ii) a lift position in which the puck assembly does not rest on the base assembly; and wherein the authorization list comprises a plurality of unique fob identifiers for the authorized security fobs.

2. The system of claim 1 wherein the security circuitry is resident in the puck assembly.

3. The system of claim 1 further comprising wherein the computer system further comprises a wireless transceiver;

wherein the stored authorization list comprises a cache of the one or more authorized fob identifiers for the one or more authorized security fobs;

wherein logic in the computer system compares the fob identifier to the stored authorization list cache in memory to determine whether a match exists.

4. The system of claim 1 wherein the two or more security fobs are passive security fobs; and wherein the product display assembly energizes the passive two or more security fobs in order to cause the passive security fobs to emit the fob identifier.

5. The system of claim 4 wherein each of the passive security fobs include an RFID chip and an interface, and wherein the interface comprises an RFD reader that emits a field for energizing the RFID chip when the passive security fob is proximate to the RFID reader.

6. The system of claim 5 wherein the passive security fob comprises a badge or card that includes the RFID chip.

7. The system of claim 5 wherein the RFID reader is resident in the puck assembly.

8. The system of claim 5 wherein the RFID reader is resident in the base assembly.

9. The system of claim 5 wherein the security circuitry when in the armed state triggers an alarm in response to a removal of the product from the puck assembly, and wherein the product display assembly disarms the security circuitry in response to the communicated security code.

10. The system of claim 1 wherein each security fob comprises:

a processor;

memory that stores the security code and the associated unique fob identifier;

a wireless I/O; and software programs stored in the memory that when executed by the processor perform operations comprising:

transmitting the fob identifier, and transmitting the security code via the wireless I/O to the product display assembly when the authorization signal corresponding to the security fob is detected.

11. The system of claim 10 wherein the authorization signal includes an authorization code such that the processor performs operation comprising:

comparing the authorization code of the authorization signal with an authorization code stored in the memory; and when the authorization code of the signal matches the authorization code stored in the memory, transmitting the security code via the wireless I/O.

12. The system of claim 1 wherein the fob identifiers are different for each of the two or more security fobs and the security code is shared by the two or more security fobs.

13. The system of claim 1 wherein the computer system transmits the authorization signal to the security fob.

14. The system of claim 1 wherein the computer system transmits the authorization signal to the product display assembly and the product display assembly transmits the authorization signal to the security fob.

* * * * *